(12) United States Patent
Hayashi et al.

(10) Patent No.: US 12,474,078 B2
(45) Date of Patent: Nov. 18, 2025

(54) AIR CONDITIONER

(71) Applicant: DAIKIN INDUSTRIES, LTD., Osaka (JP)

(72) Inventors: Nobuo Hayashi, Osaka (JP); Takurou Ogawa, Osaka (JP); Takayuki Miyajima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 167 days.

(21) Appl. No.: 18/371,711

(22) Filed: Sep. 22, 2023

(65) Prior Publication Data

US 2024/0011663 A1 Jan. 11, 2024

Related U.S. Application Data

(63) Continuation of application No. PCT/JP2022/013244, filed on Mar. 22, 2022.

(30) Foreign Application Priority Data

Mar. 26, 2021 (JP) .................................. 2021-053661
Apr. 13, 2021 (JP) .................................. 2021-067836

(51) Int. Cl.
  *F24F 11/88* (2018.01)
(52) U.S. Cl.
  CPC .................................. *F24F 11/88* (2018.01)
(58) Field of Classification Search
  CPC ............. F24F 11/88; F24F 11/37; F24F 11/47
  USPC ........................................................ 62/228.1
  See application file for complete search history.

(56) References Cited

FOREIGN PATENT DOCUMENTS

| EP | 0 353 715 A2 | 2/1990 |
|---|---|---|
| JP | 2-46173 A | 2/1990 |
| JP | 2004-364491 A | 12/2004 |
| JP | 2007-205687 A | 8/2007 |
| JP | 2012-151993 A | 8/2012 |
| JP | 5741000 B2 | 7/2015 |
| KR | 101726099 B1 | 4/2017 |
| KR | 20190005644 A | 1/2019 |

OTHER PUBLICATIONS

International Preliminary Report of corresponding PCT Application No. PCT/JP2022/013244 dated Oct. 5, 2023.

(Continued)

*Primary Examiner* — Nael N Babaa
(74) *Attorney, Agent, or Firm* — GLOBAL IP COUNSELORS, LLP

(57) ABSTRACT

An air conditioner includes an indoor unit, outdoor unit, indoor unit power line, and outdoor unit power line. The power lines branch from a common power line. Each of the indoor and outdoor units includes a converter circuit, an inverter circuit, and a capacitor. A total of effective values of integer-order components from second to 40th orders in a total current, which is obtained by adding up an indoor-unit input current and an outdoor-unit input current and which flows through the common power line, is less than a sum of a total of effective values of integer-order components from the second to 40th orders included in the indoor-unit input current that flows through the indoor-unit power line and a total of effective values of integer-order components from the second to 40th orders included in the outdoor-unit input current that flows through the outdoor-unit power line.

19 Claims, 15 Drawing Sheets

(56) References Cited

OTHER PUBLICATIONS

International Search Report of corresponding PCT Application No. PCT/JP2022/013244 dated May 31, 2022.
European Search Report of corresponding EP Application No. 22 77 5611.1 dated Feb. 4, 2025.

AIR CONDITIONER

CROSS-REFERENCE TO RELATED APPLICATIONS

This is a continuation of International No. PCT/JP2022/013244 filed on Mar. 22, 2022, which claims priority to Japanese Patent Application Nos. 2021-053661 and 2021-067836, filed on Mar. 26, 2021 and Apr. 13, 2021, respectively. The entire disclosures of these applications are incorporated by reference herein.

BACKGROUND

Technical Field

The present disclosure relates to an air conditioner including an indoor unit and an outdoor unit.

Background Art

Japanese Patent No. 5741000 discloses a power converter including a converter circuit, an inverter circuit, and a capacitor. The converter circuit rectifies alternating current (AC) power supplied from an alternating current (AC) power source to direct current (DC) power, and outputs the DC power. The inverter circuit converts the DC power output by the converter circuit into AC power. The capacitor is connected between input nodes of the inverter circuit.

SUMMARY

A first aspect of the present disclosure is directed to an air conditioner including an indoor unit, an outdoor unit, an indoor-unit power line, and an outdoor-unit power line. The indoor and outdoor unit power lines branch from a common power line connected to an AC power source. Power is supplied from the indoor-unit power line to the indoor unit, and power is supplied from the outdoor-unit power line to the outdoor unit. Each of the indoor unit and the outdoor unit includes a converter circuit configured to rectify AC power delivered from the AC power source to an associated one of the power lines to DC power and to output the DC power, an inverter circuit configured to convert the DC power output by the converter circuit into AC power, and a capacitor connected between input nodes of the inverter circuit. A total of effective values of integer-order components from second to 40th orders in a total current, which is obtained by adding up an indoor-unit input current and an outdoor-unit input current and which flows through the common power line, is less than a sum of a total of effective values of integer-order components from the second to 40th orders included in the indoor-unit input current that flows through the indoor-unit power line and a total of effective values of integer-order components from the second to 40th orders included in the outdoor-unit input current that flows through the outdoor-unit power line.

DETAILED DESCRIPTION OF EMBODIMENT(S)

Embodiments of the present disclosure will be described below with reference to the drawings. The following embodiments are merely exemplary ones in nature, and are not intended to limit the scope, applications, or use of the invention.

First Embodiment

Figure 1:
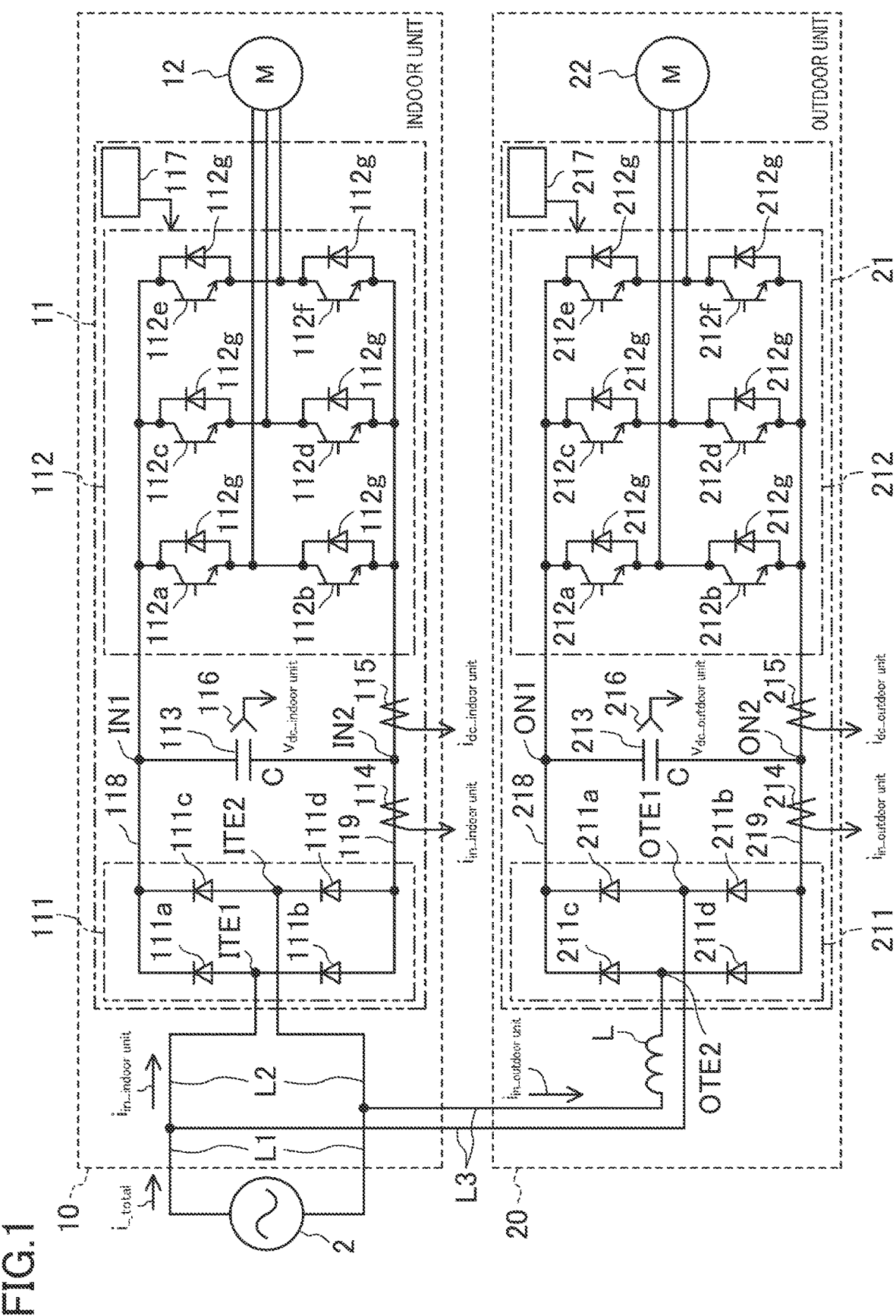
FIG. 1 is a circuit diagram illustrating a configuration of an air conditioner according to a first embodiment.

FIG. 1 illustrates an air conditioner (1) according to a first embodiment of the present disclosure. This air conditioner (1) includes an indoor unit (10), an outdoor unit (20), and first to third power lines (L1 to L3).

The indoor unit (10) includes an indoor-unit power converter (11), a fan motor (12), and an indoor-unit housing (not shown). The indoor-unit power converter (11) and the fan motor (12) are housed in the indoor-unit housing. The outdoor unit (20) includes an outdoor-unit power converter (21), a compressor motor (22), and an outdoor-unit housing (not shown). The outdoor-unit power converter (21) and the compressor motor (22) are housed in the outdoor-unit housing.

The first power line (L1) is connected to a single-phase AC power source (2). The first power line (L1) is led into the indoor-unit housing of the indoor unit (10). The first power line (L1) branches into the second and third power lines (L2, L3) in the indoor unit (10). Power is supplied through the second power line (L2) to the indoor-unit power converter (11) of the indoor unit (10). The third power line (L3) is led into the outdoor-unit housing of the outdoor unit (20). Power is supplied through the third power line (L3) to the outdoor-unit power converter (21) of the outdoor unit (20). The first power line (L1) constitutes a common power line, the second power line (L2) constitutes an indoor-unit power line, and the third power line (L3) constitutes an outdoor-unit power line.

The indoor-unit power converter (11) converts AC power delivered from the single-phase AC power source (2) to the second power line (L2) into AC power with an intended frequency and an intended voltage, and supplies the resultant AC power to the fan motor (12). Specifically, the indoor-unit power converter (11) includes an indoor-unit converter circuit (111), an indoor-unit inverter circuit (112), an indoor-unit capacitor (113), an indoor-unit input current measurer (114), an indoor-unit direct current measurer (115), an indoor-unit direct-current (DC) voltage measurer (116), and an indoor-unit control unit (117).

The indoor-unit converter circuit (111) rectifies the AC power delivered from the single-phase AC power source (2) to the second power line (L2) to DC power, and outputs the DC power to first and second indoor-unit direct-current (DC) power lines (118, 119). The indoor-unit converter circuit (111) includes first and second indoor-unit input terminals (ITE1, ITE2), which receive AC power from the second power line (L2). The indoor-unit converter circuit (111) includes bridge-connected first to fourth indoor-unit rectifier diodes (111a to 111d). The first to fourth indoor-unit rectifier diodes (111a to 111d) each have a cathode directed toward the first indoor-unit direct-current power line (118), and an anode directed toward the second indoor-unit DC power line (119). The first and second indoor-unit rectifier diodes (111a, 111b) are connected to each other in series in this order from the first indoor-unit DC power line (118) between the first and second indoor-unit DC power lines (118, 119), and the contact between these diodes is connected to the first indoor-unit input terminal (ITE1). The third and fourth indoor-unit rectifier diodes (111c, 111d) are connected to each other in series in this order from the first indoor-unit DC power line (118) between the first and second indoor-unit DC power lines (118, 119), and the contact between these diodes is connected to the second indoor-unit input terminal (ITE2).

The indoor-unit inverter circuit (112) converts the DC power output by the indoor-unit converter circuit (111) into AC power by a switching operation, and supplies the resultant AC power to the fan motor (12). Specifically, the indoor-unit inverter circuit (112) includes six indoor-unit switching elements (112a to 112f), and six indoor-unit freewheeling diodes (112g). The six indoor-unit switching elements (112a to 112f) are bridge-connected. More specifically, the indoor-unit inverter circuit (112) includes three switching legs connected between the first and second indoor-unit DC power lines (118, 119). Each switching leg includes two indoor-unit switching elements (112a to 112f) connected to each other in series. In each of the three switching legs, a midpoint between an upper-arm indoor-unit switching element (112a, 112c, 112e) and a lower-arm indoor-unit switching element (112b, 112d, 112f) is connected to a corresponding one of the coils (u-phase, v-phase, and w-phase coils) of the respective phases of the fan motor (12). Each of the indoor-unit switching elements (112a to 112f) is connected in antiparallel with a corresponding one of the indoor-unit freewheeling diodes (112g).

The indoor-unit capacitor (113) is connected between input nodes (IN1, IN2) of the indoor-unit inverter circuit (112) (i.e., between the first and second indoor-unit DC power lines (118, 119)). The indoor-unit capacitor (113) is connected in parallel with the indoor-unit converter circuit (111) and the indoor-unit inverter circuit (112). The indoor-unit capacitor (113) is a smoothing capacitor that smoothes the output voltage of the indoor-unit converter circuit (111).

The indoor-unit input current measurer (114) measures the indoor-unit input current ($i_{in\_indoor\_unit}$) flowing through the second power line (L2). The indoor-unit input current measurer (114) is provided in the second indoor-unit DC power line (119).

The indoor-unit direct current measurer (115) measures the indoor-unit direct current ($i_{dc\_indoor\_unit}$) indoor unit) to be received by the indoor-unit inverter circuit (112).

The indoor-unit DC voltage measurer (116) measures the DC voltage (DC link voltage) ($v_{dc\_indoor\_unit}$) across the indoor-unit capacitor (113).

Figure 2:
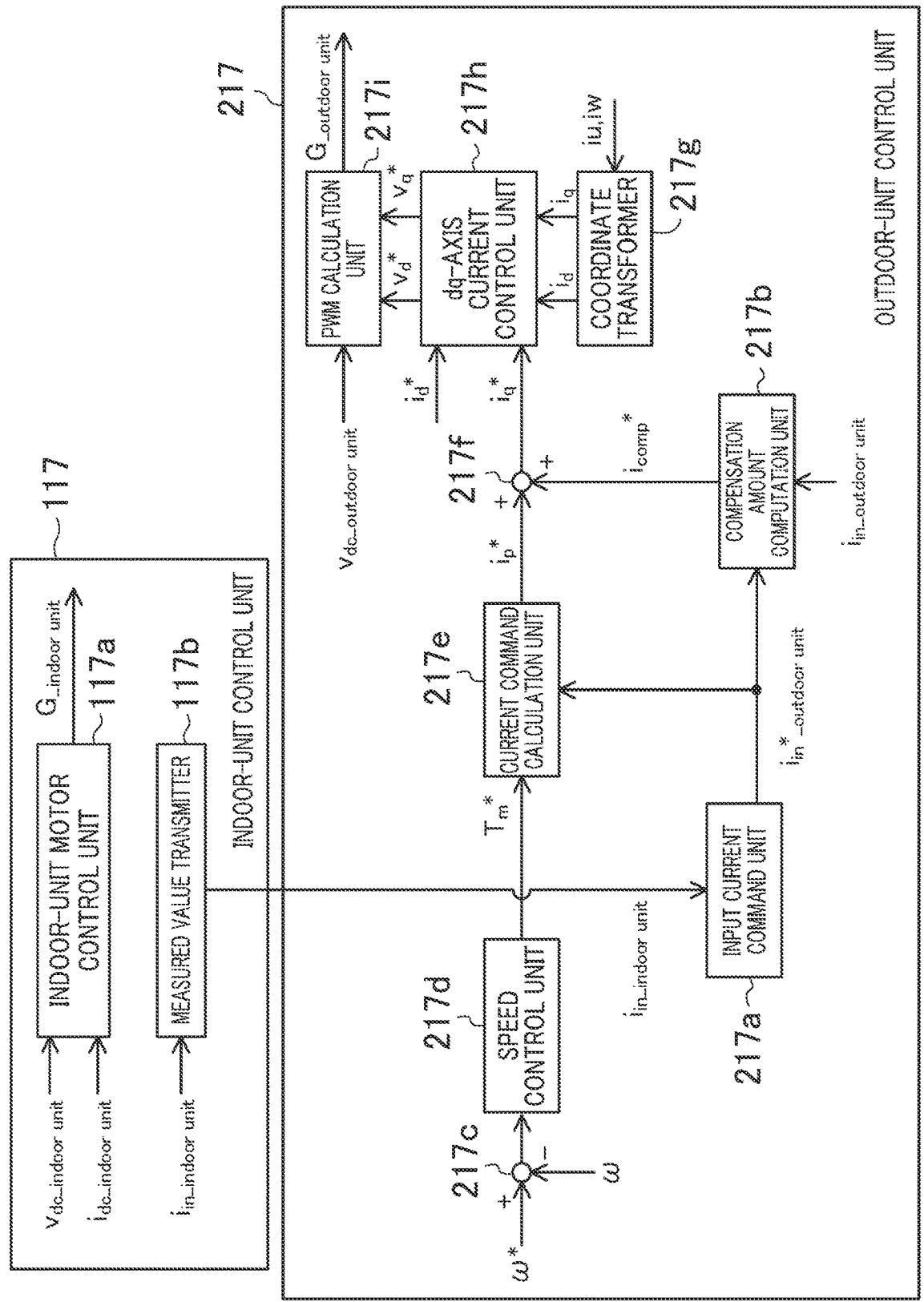
FIG. 2 is a functional block diagram illustrating configurations of an indoor-unit control unit and an outdoor-unit control unit.

The indoor-unit control unit (117) includes a microcomputer and a memory device that stores software programs for controlling the microcomputer. As shown in FIG. 2, the indoor-unit control unit (117) includes an indoor-unit motor control unit (117a) and a measured value transmitter (117b).

The indoor-unit motor control unit (117a) controls the switching elements (112a to 112f) of the indoor-unit inverter circuit (112) through a control signal (G indoor unit), based on the values measured by the indoor-unit direct current measurer (115) and the indoor-unit DC voltage measurer (116), so that the number of revolutions of the fan motor (12) is equal to a given command value.

The measured value transmitter (117b) transmits the indoor-unit input current ($i_{in\_indoor\_unit}$) measured by the indoor-unit input current measurer (114) to the outdoor unit (20).

The fan motor (12) is driven by the AC power supplied from the indoor-unit power converter (11).

As illustrated in FIG. 1, the outdoor-unit power converter (21) includes a reactor (L), an outdoor-unit converter circuit (211), an outdoor-unit inverter circuit (212), an outdoor-unit capacitor (213), an outdoor-unit input current measurer (214), an outdoor-unit direct current measurer (215), an outdoor-unit DC voltage measurer (216), and an outdoor-unit control unit (217) serving as a control means.

The reactor (L) is provided in the third power line (L3). Specifically, one end of the reactor (L) is connected to the single-phase AC power source (2) via the first power line (L1). Meanwhile, the other end of the reactor (L) is connected to a second outdoor-unit input terminal (OTE2) of the outdoor-unit converter circuit (211) to be described later.

The outdoor-unit converter circuit (211) rectifies the AC power delivered from the single-phase AC power source (2) to the third power line (L3) to DC power, and outputs the DC power to first and second outdoor-unit DC power lines (218, 219). The outdoor-unit converter circuit (211) includes a first outdoor-unit input terminal (OTE1) and the second outdoor-unit input terminal (OTE2), which receive AC power from the third power line (L3). The outdoor-unit converter circuit (211) is a bridge circuit that includes bridge-connected first to fourth outdoor-unit rectifier diodes (211a to 211d). The first to fourth outdoor-unit rectifier diodes (211a to 211d) each have a cathode directed toward the first outdoor-unit DC power line (218), and an anode directed toward the second outdoor-unit DC power line (219). The first and second outdoor-unit rectifier diodes (211a, 211b) are connected to each other in series in this order from the first outdoor-unit DC power line (218) between the first and second outdoor-unit DC power lines (218, 219), and the contact between these diodes is connected to the first outdoor-unit input terminal (OTE1). The third and fourth outdoor-unit rectifier diodes (211c, 211d) are connected to each other in series in this order from the first outdoor-unit DC power line (218) between the first and second outdoor-unit DC power lines (218, 219), and the contact between these diodes is connected to the second outdoor-unit input terminal (OTE2).

The outdoor-unit inverter circuit (212) converts the DC power output by the outdoor-unit converter circuit (211) into AC power by a switching operation, and supplies the resultant AC power to the compressor motor (22). Specifically, the outdoor-unit inverter circuit (212) includes six outdoor-unit switching elements (212a to 212f), and six outdoor-unit freewheeling diodes (212g). The six outdoor-unit switching elements (212a to 212f) are bridge-connected. More specifically, the outdoor-unit inverter circuit (212) includes three switching legs connected between the first and second outdoor-unit DC power lines (218, 219). Each switching leg has two outdoor-unit switching elements (212a to 212f) connected to each other in series. In each of the three switching legs, a midpoint between an upper-arm outdoor-unit switching element (212a, 212c, 212e) and a lower-arm outdoor-unit switching element (212b, 212d, 212f) is connected to a corresponding one of the coils (u-phase, v-phase, and w-phase coils) of the respective phases of the compressor motor (22). Each of the outdoor-unit switching elements (212a to 212f) is connected in antiparallel with a corresponding one of the outdoor-unit freewheeling diodes (212g).

The outdoor-unit capacitor (213) is connected between input nodes (ON1, ON2) of the outdoor-unit inverter circuit (212) (i.e., between the first and second outdoor-unit DC power lines (218, 219)). The outdoor-unit capacitor (213) is connected in parallel with the outdoor-unit converter circuit (211) and the outdoor-unit inverter circuit (212).

The voltage across the outdoor-unit capacitor (213) pulsates with the frequency of the input AC power supplied from the single-phase AC power source (2). The capacitance of the outdoor-unit capacitor (213) is set so that the outdoor-unit capacitor (213) hardly smoothes the output voltage of the outdoor-unit converter circuit (211) but successfully reduces fluctuations in the input current of the outdoor-unit converter circuit (211) which are caused by the switching operation of the outdoor-unit inverter circuit (212).

Thus, the capacitance value of the outdoor-unit capacitor (213) is approximately several tens of µF, and the output voltage of the outdoor-unit converter circuit (211) has a large pulsation the maximum value of which is larger than or equal to twice the minimum value of the pulsation.

The outdoor-unit input current measurer (214) measures the outdoor-unit input current in ($i_{in\_outdoor\_unit}$) flowing through the third power line (L3). The outdoor-unit input current measurer (214) is provided in the second outdoor-unit DC power line (219).

The outdoor-unit direct current measurer (215) measures the outdoor-unit direct current ($i_{dc\_outdoor\_unit}$) to be received by the outdoor-unit inverter circuit (212).

The outdoor-unit DC voltage measurer (216) measures the DC voltage (DC link voltage) ($v_{dc\_outdoor\_unit}$) across the outdoor-unit capacitor (213).

The outdoor-unit control unit (217) includes a microcomputer and a memory device that stores software programs for controlling the microcomputer. As shown in FIG. 2, the outdoor-unit control unit (217) includes an input current command unit (217a), a compensation amount computation unit (217b), a subtractor (217c), a speed control unit (217d), a current command calculation unit (217e), an adder (217f), a coordinate transformer (217g), a dq-axis current control unit (217h), and a pulse width modulation (PWM) calculation unit (217i).

The input current command unit (217a) receives the indoor-unit input current ($i_{in\_indoor\_unit}$) transmitted by the measured value transmitter (117b) of the indoor unit (10). A command value ($i^*_{\_total}$) of the total current (see FIG. 4) is set in advance for the input current command unit (217a). The input current command unit (217a) computes a value obtained by subtracting the indoor-unit input current ($i_{in\_indoor\_unit}$) from the command value ($i^*_{\_total}$) of the total current, in the form of a command value ($i_{in}^*{}_{\_outdoor\_unit}$) of the outdoor-unit input current. The command value ($i^*_{\_total}$) of the total current is set using, for example, the time or phase of the fundamental of supply voltage as an argument, based on a table indicating a plurality of combinations of the time or phase of the fundamental of supply voltage and the current value (the command value).

Figure 3:
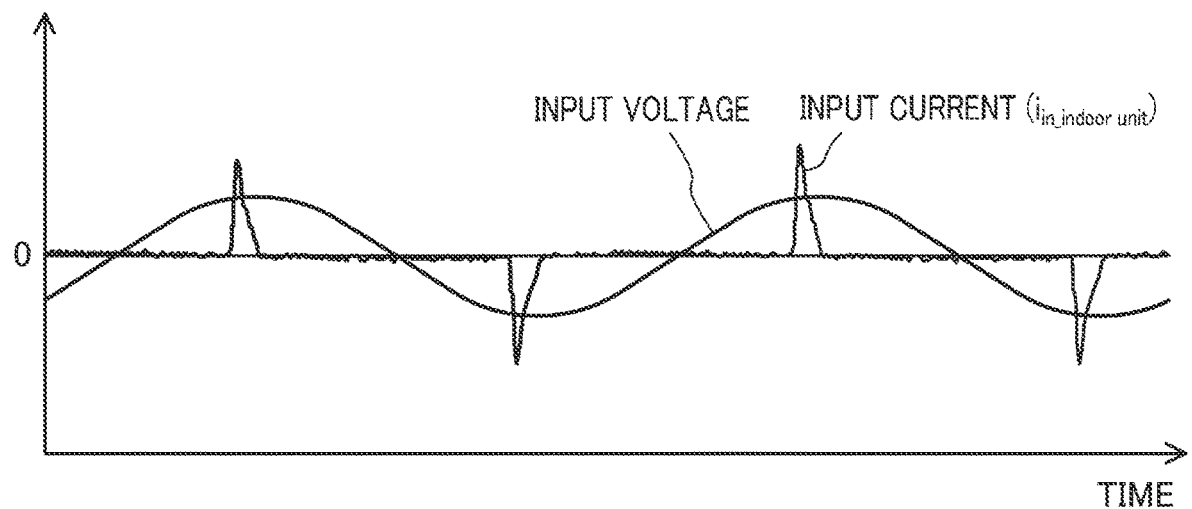
FIG. 3 is a timing diagram showing the input current and input voltage of an indoor-unit converter circuit.
Figure 4:
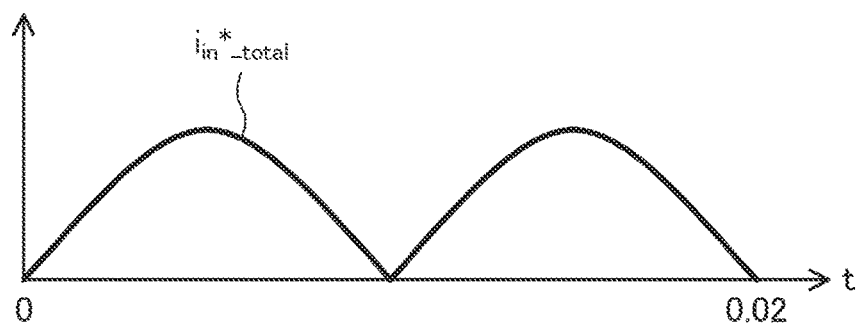
FIG. 4 is a timing diagram exemplifying command values of the total current.

The command value ($i_{in}^*{}_{\_outdoor\_unit}$) of the outdoor-unit input current is computed through subtraction of, for example, the measured value of the indoor-unit input current ($i_{in\_indoor\_unit}$) shown in FIG. 3 from the command value ($i^*_{\_total}$) of the total current shown in FIG. 4.

The compensation amount computation unit (217b) computes the amount ($i_{comp}^*$) of q-axis current command compensation so that the deviation between the command value ($i_{in}^*{}_{\_outdoor\_unit}$) of the outdoor-unit input current and the measured value of the outdoor-unit input current ($i_{in\_indoor\_unit}$) measured by the outdoor-unit input current measurer (214) becomes small, and outputs the computed value. The compensation amount computation unit (217b) determines the amount ($i_{comp}^*$) of q-axis current command compensation by, for example, proportional integral (PI) calculation based on the deviation between the command value ($i_{in}^*{}_{\_outdoor\_unit}$) of the outdoor-unit input current and the measured value of the outdoor-unit input current ($i_{in\_indoor\_unit}$).

The subtractor (217c) computes the deviation between the number of revolutions (ω) of the compressor motor (22) and a command value (ω*) of the number of revolutions. The number of revolutions (ω) of the compressor motor (22) can be computed based on the outdoor-unit direct current ($i_{dc\_outdoor\_unit}$) measured by the outdoor-unit direct current measurer (215), the outdoor-unit DC voltage ($v_{dc\_outdoor\_unit}$), and the output ($G_{\_outdoor\_unit}$) (to be described later) of the PWM calculation unit (217i). Specifically, the u-phase current ($i_u$), v-phase current ($i_v$), and w-phase current ($i_w$) through the compressor motor (22) and the u-phase voltage, v-phase voltage, and w-phase voltage across the compressor motor (22) are figured out from the outdoor-unit direct current ($i_{dc\_outdoor\_unit}$), the outdoor-unit DC voltage ($v_{dc\_outdoor\_unit}$), and the output ($G_{\_outdoor\_unit}$) of the PWM calculation unit (217i). The position of the magnetic pole of the compressor motor (22) can be estimated based on these values and the motor constant. The differential value of the position of the magnetic pole of the compressor motor (22) is the electrical angular frequency of the compressor motor (22), and the number of revolutions (ω) of the compressor motor (22) is a value obtained by dividing this electrical angular frequency by the number of pole pairs of the compressor motor (22).

The speed control unit (217d) generates a command value of the average motor torque (hereinafter referred to as the "average torque command value ($T_m$*)") by, for example, PID calculation (proportion, integration, differentiation) based on the deviation between the number of revolutions (ω) of the compressor motor (22) and the command value (ω*) of the number of revolutions.

The current command calculation unit (217e) derives the inverter power from the command value ($i_{in}$*$_{\_outdoor\ unit}$) of the outdoor-unit input current calculated by the input current command unit (217a), normalizes the inverter power so that the average inverter power is equal to one, and multiplies the normalized value by the average torque command value ($T_m$*), thereby generating a pulsation command value ($i_p$*) serving as a basis for a command value of the q-axis current ($i_q$) (hereinafter referred to as the "q-axis current command value ($i_q$*)"). The inverter power can be derived from the method disclosed in Japanese Unexamined Patent Publication No. 2019-68731.

The adder (217f) adds the pulsation command value ($i_p$*) generated by the current command calculation unit (217e) and the amount ($i_{comp}$*) of q-axis current command compensation determined by the compensation amount computation unit (217b) together, and outputs the result of this addition in the form of the q-axis current command value ($i_q$*).

The coordinate transformer (217g) derives the d-axis and q-axis currents ($i_d$) and ($i_q$) of the compressor motor (22) from the u-phase and w-phase currents ($i_u$) and ($i_w$) of the compressor motor (22) and the electrical angle (motor phase) of a rotor (not shown) by so-called dq transformation. The values of the u-phase and w-phase currents ($i_u$) and ($i_w$) can be directly detected by, for example, a current sensor installed, or can be even computed based on the outdoor-unit direct current ($i_{dc\_outdoor\ unit}$) and the output ($G_{\_outdoor\ unit}$) of the PWM calculation unit (217i).

The dq-axis current control unit (217h) derives the d-axis and q-axis voltage command values ($v_d$*) and ($v_q$*) from the d-axis current command value ($i_d$*), the q-axis current command value ($i_q$*), the d-axis current ($i_d$), and the q-axis current ($i_q$). Specifically, the dq-axis current control unit (217h) derives the d-axis and q-axis voltage command values ($v_d$*) and ($v_q$*) so that the deviation between the d-axis current command value ($i_d$*) and the d-axis current ($i_d$) and the deviation between the q-axis current command value ($i_q$*) and the q-axis current ($i_q$) each become small.

The PWM calculation unit (217i) generates a control signal ($G_{\_outdoor\ unit}$) for controlling the ON/OFF operations of the outdoor-unit switching elements (212a to 212f) of the outdoor-unit inverter circuit (212). Specifically, the PWM calculation unit (217i) sets the duty ratio of the control signal ($G_{\_outdoor\ unit}$) to be supplied to each of the switching elements (212a to 212f), based on the motor phase, the outdoor-unit DC voltage ($v_{dc\_outdoor\ unit}$), the d-axis voltage command value ($v_d$*), the q-axis voltage command value ($v_u$*), and the position of the magnetic pole of the compressor motor (22). Upon reception of the control signal ($G_{\_outdoor\ unit}$), each of the switching elements (212a to 212f) performs the switching operation (ON/OFF operation) at the duty ratio set by the PWM calculation unit (217i). This control signal ($G_{\_outdoor\ unit}$) is periodically updated to control the switching operation in the outdoor-unit inverter circuit (212).

The compressor motor (22) is driven by the AC power supplied from the outdoor-unit power converter (21).

When the indoor-unit power converter (11) and outdoor-unit power converter (21) of the air conditioner (1) configured as described above start operating, the measured value transmitter (117b) of the indoor-unit control unit (117) transmits the indoor-unit input current ($i_{in\_indoor\ unit}$) measured by the indoor-unit input current measurer (114) to the outdoor unit (20). The input current command unit (217a) of the outdoor-unit control unit (217) computes a value obtained by subtracting the indoor-unit input current ($i_{in\_indoor\ unit}$) from the command value ($i$*$_{\_total}$) of the total current set in advance, in the form of a command value ($i_{in}$*$_{\_outdoor\ unit}$) of the outdoor-unit input current. The compensation amount computation unit (217b) computes the amount ($i_{comp}$*) of q-axis current command compensation so that the deviation between the command value ($i_{in}$*$_{\_outdoor\ unit}$) of the outdoor-unit input current and the measured value of the outdoor-unit input current ($i_{in\_indoor\ unit}$) becomes small, and outputs the computed value. The adder (217f) adds this amount ($i_{comp}$*) of q-axis current command compensation and the pulsation command value ($i_p$*) generated by the current command calculation unit (217e) together, and outputs the result of this addition in the form of the q-axis current command value ($i_q$*). The dq-axis current control unit (217h) and the PWM calculation unit (217i) control the ON/OFF operations of the outdoor-unit switching elements (212a to 212f) of the outdoor-unit inverter circuit (212), based on the q-axis current command value ($i_q$*).

As can be seen, the outdoor-unit control unit (217) controls the outdoor-unit inverter circuit (212), based on the measured value of the indoor-unit input current ($i_{in\_indoor\ unit}$), so that the deviation between the sum of the indoor-unit input current ($i_{in\_indoor\ unit}$) and the outdoor-unit input current ($i_{in\_outdoor\ unit}$) and the command value ($i$*$_{\_total}$) of the total current set in advance becomes small.

As a result, the total of the effective values of integer-order components from the second to 40th orders in the total current ($i$*$_{\_total}$) which is obtained by adding up the indoor-unit input current ($i_{in\_indoor\ unit}$) and the outdoor-unit input current ($i_{in\_outdoor\ unit}$) and which flows through the first power line (L1) is less than the sum of the total of the effective values of integer-order components from the second to 40th orders included in the indoor-unit input current ($i_{in\_indoor\ unit}$) that flows through the second power line (L2) and the total of the effective values of integer-order components from the second to 40th orders included in the outdoor-unit input current ($i_{in\_outdoor\ unit}$) that flows through the third power line (L3). Specifically, the following formula (1) holds true where $i_{k\_indoor\ unit}$ represents the k-th order component included in the indoor-unit input current ($i_{in\_indoor\ unit}$), $i_{k\_outdoor\ unit}$ represents the k-th order component included in the outdoor-unit input current ($i_{in\_outdoor\ unit}$), and $i_{k\_total}$ represents the k-th order component included in the total current ($i_{\_total}$).

Formula 1

$$\sum_{k=2}^{40} i_{k\_indoor\ unit} + \sum_{k=2}^{40} i_{k\_outdoor\ unit} > \sum_{k=2}^{40} i_{k\_total} \qquad \text{Formula (1)}$$

Figure 5:
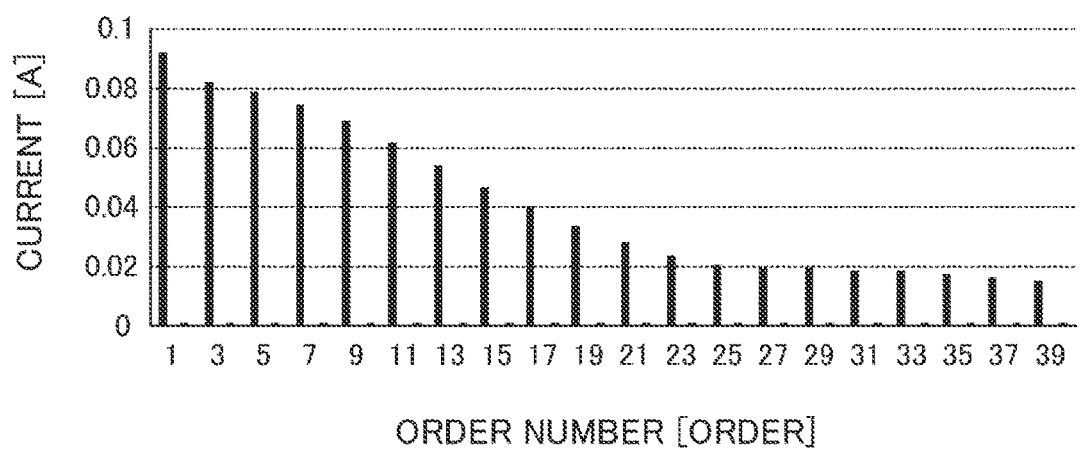
FIG. 5 is a graph showing harmonic components superimposed on the indoor-unit input current.

Here, FIG. 5 shows harmonic components superimposed on the indoor-unit input current ($i_{in\_indoor\ unit}$). The harmonic components superimposed on the input current of the indoor-unit converter circuit (111) are obtained through fast Fourier transform (FFT) of the indoor-unit input current ($i_{in\_indoor\ unit}$).

Figure 6:
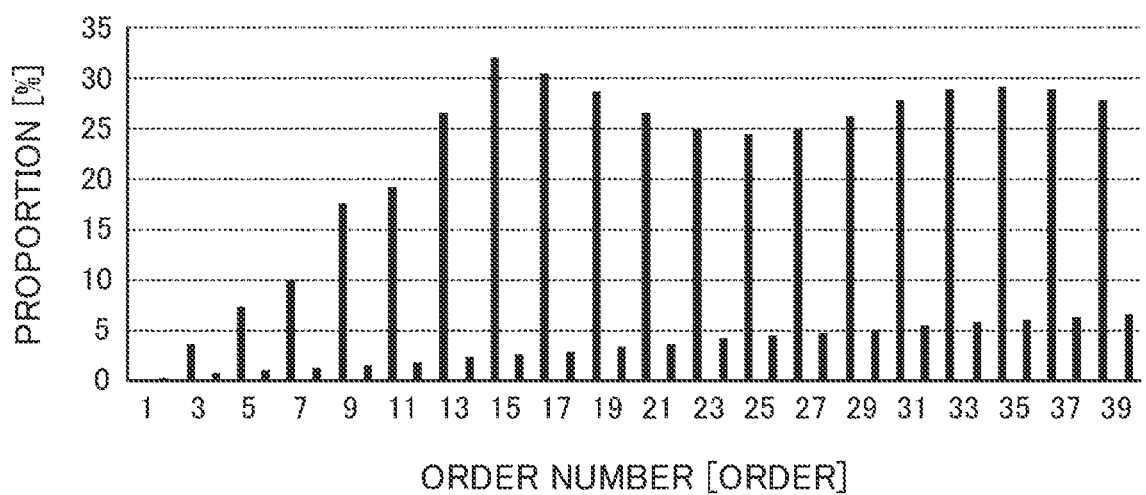
FIG. 6 is a graph showing the proportion of the harmonic components superimposed on the indoor-unit input current to the limits of harmonic components specified in IEC 61000-3-2.

FIG. 6 is a graph showing the proportions of the harmonic components superimposed on the indoor-unit input current ($i_{in\_indoor\ unit}$) to the limits of harmonic components specified in IEC 61000-3-2.

As shown in FIG. 6, the proportions of odd-order harmonic components from the 15th to 39th-order superimposed on the indoor-unit input current ($i_{in\_indoor\ unit}$) to the limits of harmonic components specified in IEC 61000-3-2 are higher than those of the odd-order harmonic components from the third to 13th-order.

Here, if control is performed so that the total of the effective values of integer-order components from the 15th to 40th orders included in the total current ($i_{\_total}$) becomes less than the sum of the total of the effective values of integer-order components from the 15th to 40th orders in the indoor-unit input current ($i_{in\_indoor\ unit}$) and the total of the effective values of integer-order components from the 15th to 40th orders in the outdoor-unit input current ($i_{in\_outdoor\ unit}$), the air conditioner (1) is more likely to comply with IEC 61000-3-2. Thus, control is performed so that the following formula (2) holds true.

Formula 2

$$\sum_{k=15}^{40} i_{k\_indoor\ unit} + \sum_{k=15}^{40} i_{k\_outdoor\ unit} > \sum_{k=15}^{40} i_{k\_total} \quad \text{Formula (2)}$$

In addition, the difference obtained by subtracting the total of the effective values of integer-order components from the second to 40th orders in the total current ($i_{\_total}$) from the sum of the total of the effective values of integer-order components from the second to 40th orders in the indoor-unit input current ($i_{in\_indoor\ unit}$) and the total of the effective values of integer-order components from the second to 40th orders in the outdoor-unit input current ($i_{in\_outdoor\ unit}$) is larger than ¾ of the total of the effective of the integer-order components from the second to 40th orders in the indoor-unit input current ($i_{in\_indoor\ unit}$). That is to say, the following formula (3) holds true.

Formula 3

$$\left(\sum_{k=2}^{40} i_{k\_indoor\ unit} + \sum_{k=2}^{40} i_{k\_outdoor\ unit}\right) - \sum_{k=2}^{40} i_{k\_total} > \quad \text{Formula (3)}$$

$$3/4 \sum_{k=2}^{40} i_{k\_indoor\ unit}$$

Thus, the total of the integer-order components from the second to 40th orders in the total current ($i_{\_total}$) (i.e., harmonics generated by the air conditioner (1)) can be more effectively reduced than if the above-described difference is smaller than or equal to ¾ of the total of the effective values of the integer-order components from the second to 40th orders in the indoor-unit input current ($i_{in\_indoor\ unit}$).

The effective value of an integer-order component of at least one of the second to 40th orders in the total current ($i_{\_total}$) is less than the effective value of a component of the same order in the outdoor-unit input current ($i_{in\_outdoor\ unit}$) That is to say, the following formula (4) holds true where k represents an integer indicating at least one of the second to 40th orders.

Formula 4

$$i_{k\_total} < i_{k\_outdoor\ unit} \quad (4)$$

As can be seen, at least one portion of a component of at least one of integer orders included in the outdoor-unit input current ($i_{in\_outdoor\ unit}$) is canceled by a component of the same order included in the indoor-unit input current ($i_{in\_indoor\ unit}$). This can reduce the components of the same order included in the total current ($i_{\_total}$) (i.e., harmonics of the same order generated by the air conditioner (1)). For example, if harmonics resulting from the structure of the compressor motor (22) cause the proportion of the harmonic component of the 21st order included in the outdoor-unit input current ($i_{in\_outdoor\ unit}$) to the limits of harmonic components to be prominently high, control is performed to reduce components of at least the 21st order in the total current ($i_{\_total}$).

Thus, this first embodiment allows the total of integer-order components from the second to 40th orders in the total current ($i_{\_total}$) (i.e., harmonics generated by the air conditioner (1)) to be less than if the sum of the total of the effective values of the integer-order components from the second to 40th orders included in the indoor-unit input current ($i_{in\_indoor\ unit}$) and the total of the effective values of the integer-order components from the second to 40th orders included in the outdoor-unit input current ($i_{in\_outdoor\ unit}$) is made equal to the total of the effective values of the integer-order components from the second to 40th orders in the total current ($i_{\_total}$).

Second Embodiment

Figure 7:
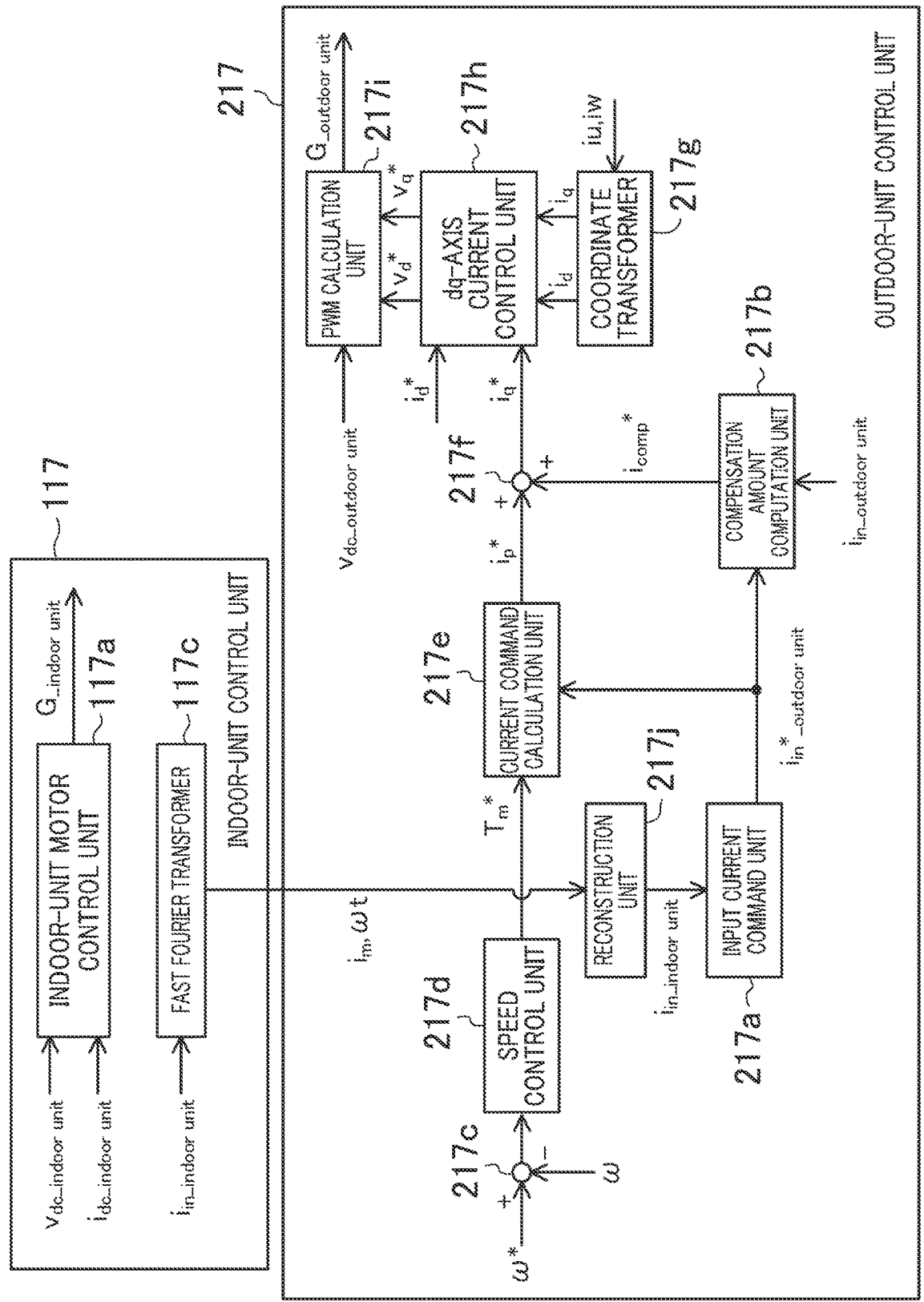
FIG. 7 is a view corresponding to FIG. 2, illustrating a second embodiment.

FIG. 7 is a view corresponding to FIG. 2, illustrating a second embodiment. In this second embodiment, an indoor-unit control unit (117) includes a fast Fourier transformer (117c) instead of the measured value transmitter (117b).

The fast Fourier transformer (117c) performs fast Fourier transform on the measured value of the indoor-unit input current ($i_{in\_indoor\ unit}$) to compute the amplitude ($i_m$) of, and phase information ($\theta_s$) on, the indoor-unit input current ($i_{in\_indoor\ unit}$), and transmits the amplitude ($i_m$) and the phase information ($\theta_s$) to an outdoor unit (20). The phase information ($\theta_s$) thus obtained is the phase obtained using, as a reference, the time when the phase of the fundamental of the supply voltage is 0 degrees.

An outdoor-unit control unit (217) further includes a reconstruction unit (217j).

This reconstruction unit (217j) reconstructs the indoor-unit input current ($i_{in\_indoor\ unit}$) based on the amplitude ($i_m$) and phase information ($\theta_s$) transmitted by the fast Fourier transformer (117c) of the indoor-unit control unit (117), and outputs the reconstructed indoor-unit input current ($i_{in\_indoor\ unit}$) to an input current command unit (217a). This reconstruction of the indoor-unit input current ($i_{in\_indoor\ unit}$) uses the phase of the fundamental of the supply voltage as a reference, based on the amplitude ($i_m$) and the phase information ($\theta_s$).

In this second embodiment, the fast Fourier transformer (117c) and the outdoor-unit control unit (217) constitute a control means.

The second embodiment is the same as, or similar to the first embodiment apart from the difference mentioned above.

Third Embodiment

Figure 8:
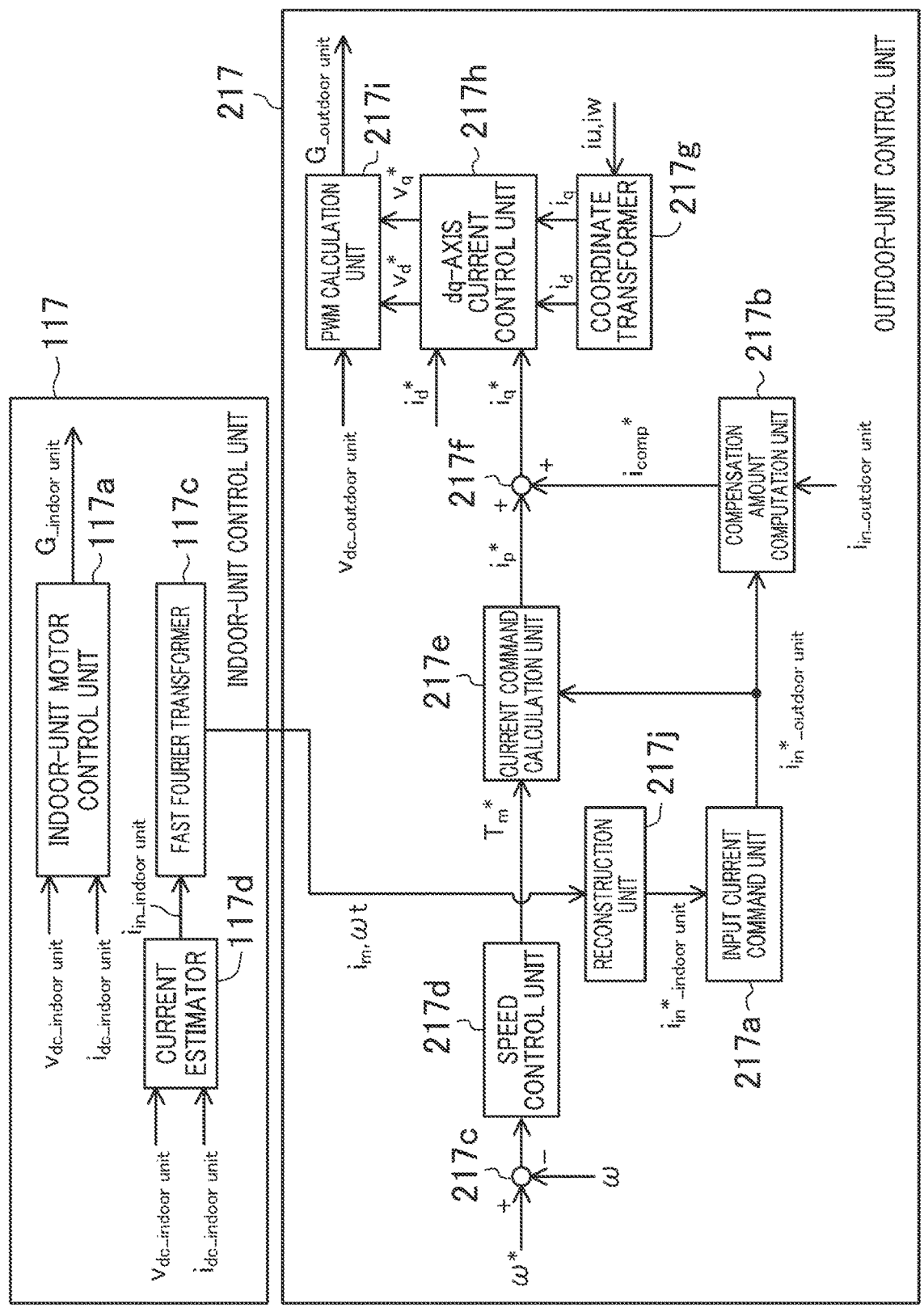
FIG. 8 is a view corresponding to FIG. 7, illustrating a third embodiment.

FIG. 8 is a view corresponding to FIG. 7, illustrating a third embodiment. In this third embodiment, an indoor-unit control unit (117) further includes a current estimator (117d).

The current estimator (117d) estimates the indoor-unit input current ($i_{in\_indoor\ unit}$) based on values measured by an indoor-unit direct current measurer (115) and an indoor-unit DC voltage measurer (116) (i.e., the indoor-unit direct current ($i_{dc\_indoor\ unit}$) and the indoor-unit DC voltage ($v_{dc\_indoor\ unit}$)), and outputs the estimated value to a fast Fourier transformer (117c). The indoor-unit input current ($i_{in\_indoor\ unit}$) can be estimated based on the following formula (5) where $i_{dc\_indoor\ unit}$ represents the indoor-unit direct current ($i_{dc\_indoor\ unit}$), $v_{dc\_indoor\ unit}$ represents the indoor-unit DC voltage ($v_{dc\_indoor\ unit}$), and $i_{in\_indoor\ unit}$ represents the indoor-unit input current ($i_{in\_indoor\ unit}$).

Formula 5

$$i_{in\_indoor\ unit} = i_{dc\_indoor\ unit} + c \cdot \frac{dv_{dc\_indoor\ unit}}{dt} \qquad \text{Formula (5)}$$

In this third embodiment, the fast Fourier transformer (117c), the current estimator (117d), and an outdoor-unit control unit (217) constitute a control means.

The third embodiment is the same as, or similar to those of the second embodiment apart from the difference mentioned above. Thus, the like reference characters are labeled to the like components, and their detailed description will not be repeated herein.

Fourth Embodiment

Figure 9:
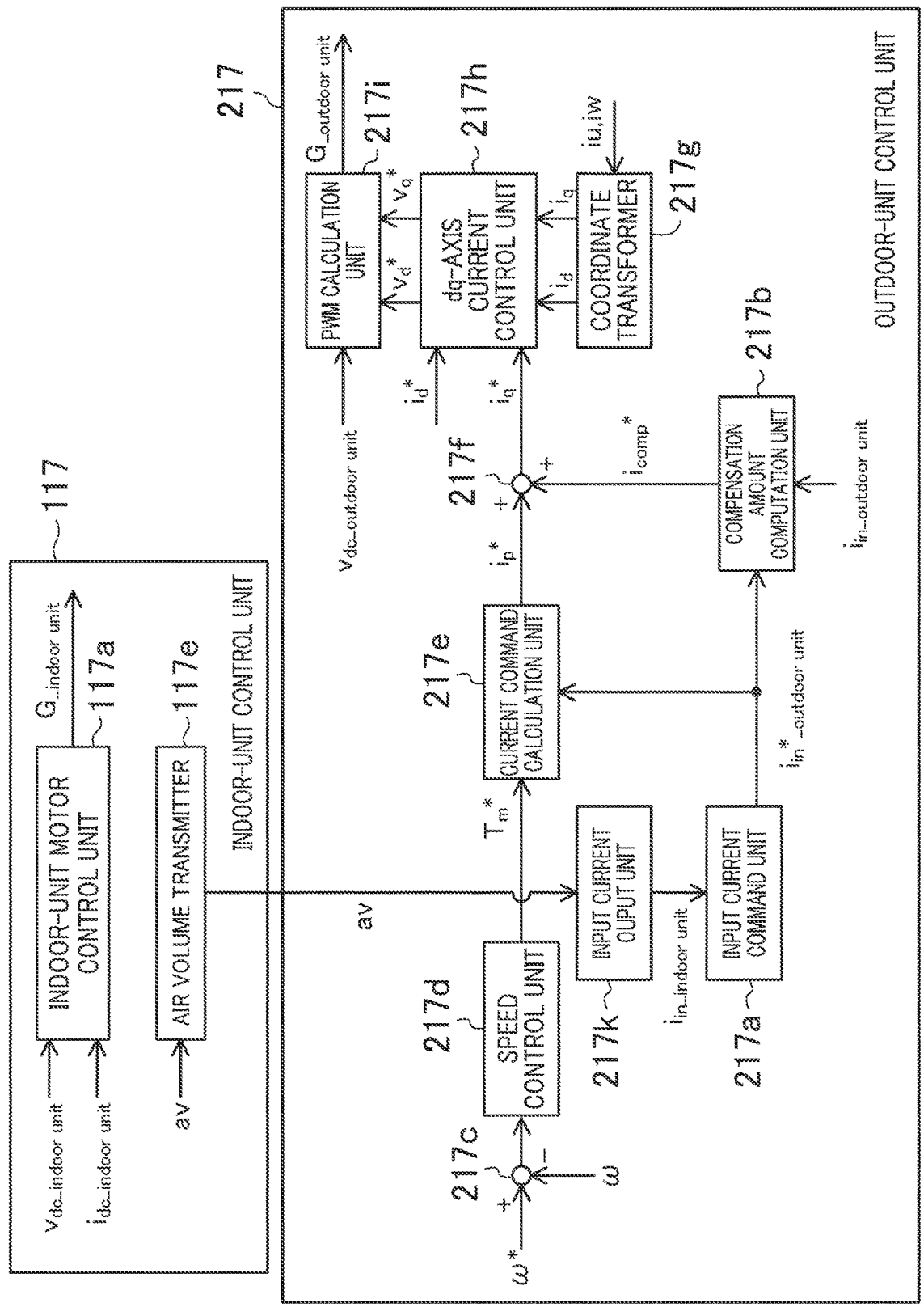
FIG. 9 is a view corresponding to FIG. 2, illustrating a fourth embodiment.

FIG. 9 is a view corresponding to FIG. 7, illustrating a fourth embodiment. In this fourth embodiment, an indoor-unit control unit (117) includes an air volume transmitter (117e) instead of the measured value transmitter (117b).

The air volume transmitter (117e) transmits a measured value of the volume (av) of air from a fan (not shown) driven by a fan motor (12) of an indoor unit (10) to an outdoor unit (20). The measured value of the volume (av) of air is measured by an air volume measurer (not shown) provided in the indoor unit (10).

An outdoor-unit control unit (217) further includes an input current output unit (217k).

This input current output unit (217k) stores a plurality of tables indicating associations between a plurality of phases of the fundamental and the indoor-unit input currents corresponding to the phases in association with a plurality of volumes of air. The input current output unit (217k) selects an appropriate table based on the volume (av) of air transmitted by the air volume transmitter (117e), and outputs the input current associated with the phase of the fundamental of the supply voltage in this table, in the form of the indoor-unit input current ($i_{in\_indoor\ unit}$), to an input current command unit (217a).

The fourth embodiment is the same as, or similar to the first embodiment apart from the difference mentioned above.

Fifth Embodiment

Figure 10:
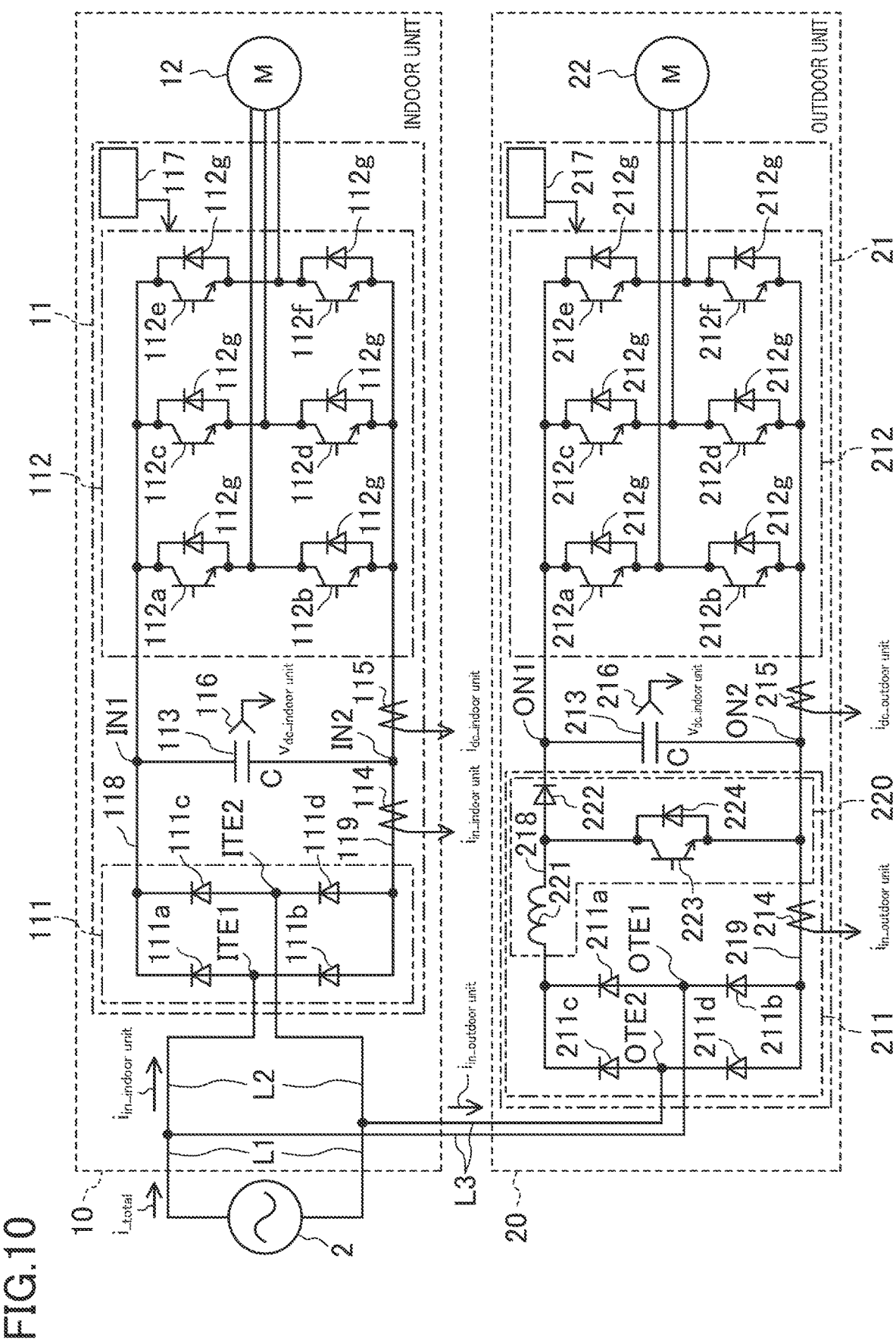
FIG. 10 is a view corresponding to FIG. 1, illustrating a fifth embodiment.

FIG. 10 is a view corresponding to FIG. 1, illustrating a fifth embodiment. In this fifth embodiment, an outdoor-unit converter circuit (211) further includes a boost converter (220).

The boost converter (220) performs DC/DC conversion on the output of a bridge circuit that includes first to fourth outdoor-unit rectifier diodes (211a to 211d). The boost converter (220) includes a converter reactor (221), a converter diode (222), a converter switching element (223), and a converter freewheeling diode (224).

The converter reactor (221) and the converter diode (222) are connected to each other in series in this order from the first and third outdoor-unit rectifier diodes (211a, 211c) between the cathodes of the first and third outdoor-unit rectifier diodes (211a, 211c) and the positive terminal of the outdoor unit capacitor (213). The cathode of the converter diode (222) is directed toward the outdoor-unit capacitor (213).

The converter switching element (223) is a bipolar transistor. The collector of the converter switching element (223) is connected to the contact between the converter reactor (221) and the converter diode (222). The emitter of the converter switching element (223) is connected to the anodes of the second and fourth outdoor-unit rectifier diodes (211b, 211d) and the negative terminal of the outdoor-unit capacitor (213).

Figure 11:
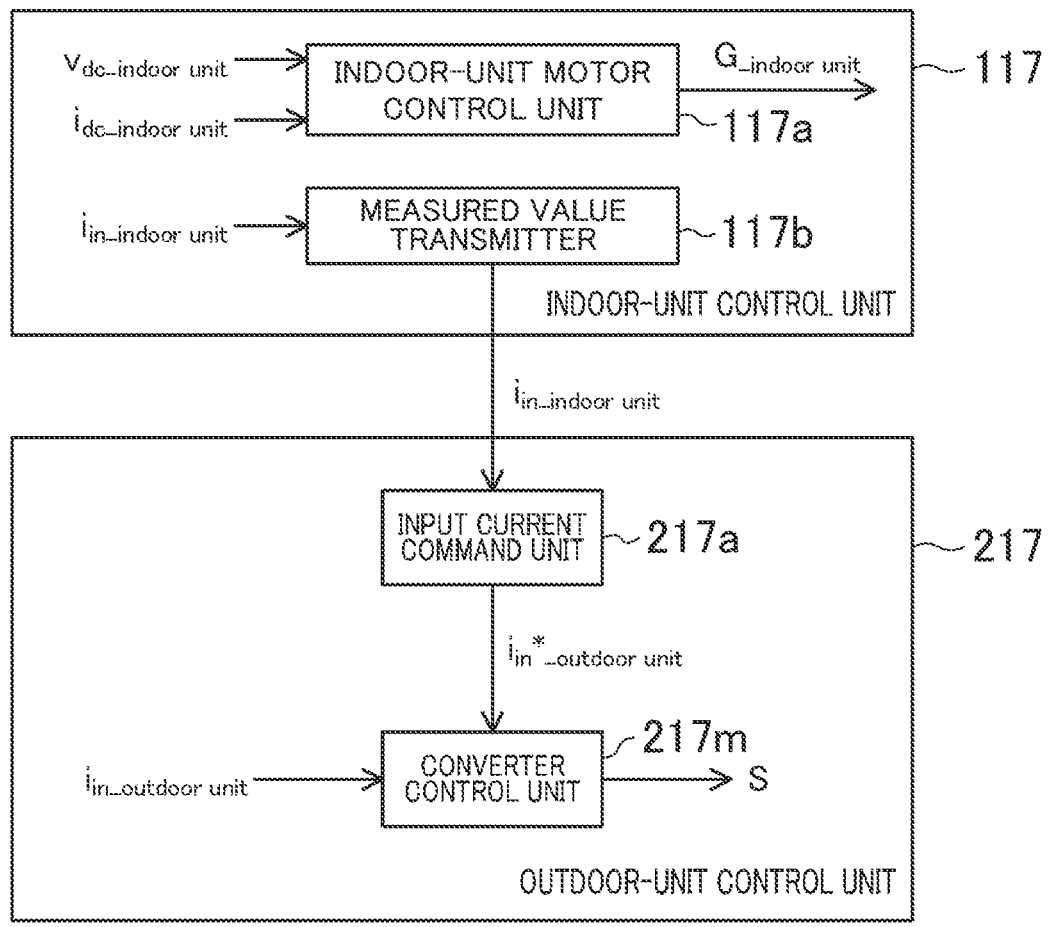
FIG. 11 is a view corresponding to FIG. 2, illustrating the fifth embodiment.

As shown in FIG. 11, an outdoor-unit control unit (217) includes an input current command unit (217a) and a converter control unit (217m).

Figure 12:
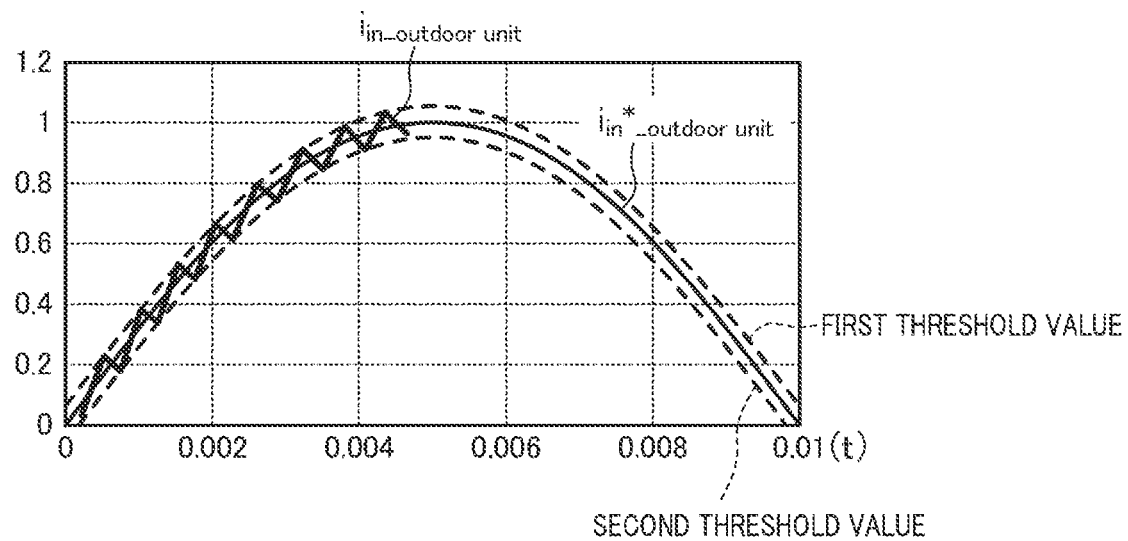
FIG. 12 is a timing diagram exemplifying command values and measured values of the outdoor-unit input current.

The converter control unit (217m) outputs an ON/OFF signal (S) for turning the converter switching element (223) on or off, based on a value measured by an outdoor-unit input current measurer (214) (i.e., the outdoor-unit input current ($i_{in\_outdoor\ unit}$)) and a command value ($i_{in}^{*}{}_{\_outdoor\ unit}$) of the outdoor-unit input current. If the value measured by the outdoor-unit input current measurer (214) (i.e., the outdoor-unit input current ($i_{in\_outdoor\ unit}$)) is greater than or equal to a first threshold value that is greater by a predetermined value than the command value ($i_{in}^{*}{}_{\_outdoor\ unit}$) of the outdoor-unit input current, the converter control unit (217m) turns the converter switching element (223) off to reduce the outdoor-unit input current ($i_{in\_outdoor\ unit}$). On the other hand, if the value measured by the outdoor-unit input current measurer (214) (i.e., the outdoor-unit input current ($i_{in\_outdoor\ unit}$)) is equal to or less than a second threshold value that is less by a predetermined value than the command value ($i_{in}^{*}{}_{\_outdoor\ unit}$) of the outdoor-unit input current, the converter control unit (217m) turns the converter switching element (223) on to increase the outdoor-unit input current ($i_{in\_outdoor\ unit}$) FIG. 12 shows the outdoor-unit input current ($i_{in\_outdoor\ unit}$), the command value ($i_{in}^{*}{}_{\_outdoor\ unit}$) of the outdoor-unit input current, the first threshold value, and the second threshold value.

As can be seen, the converter control unit (217m) of the outdoor-unit control unit (217) controls the outdoor-unit converter circuit (211), based on the measured value of the indoor-side input current ($i_{in\_indoor\ unit}$), so that the deviation between the command value ($i_{in}^{*}{}_{\_outdoor\ unit}$) of the outdoor-unit input current and the outdoor-unit input current ($i_{in\_outdoor\ unit}$) determined by the difference between the command value ($i^*_{\_total}$) of the total current set in advance and the indoor-unit input current ($i_{in\_indoor\ unit}$) falls below the predetermined value.

The fifth embodiment is the same as, or similar to the first embodiment apart from the difference mentioned above. Thus, the like reference characters are used to indicate the like components, and their detailed description will not be repeated.

Sixth Embodiment

Figure 13:
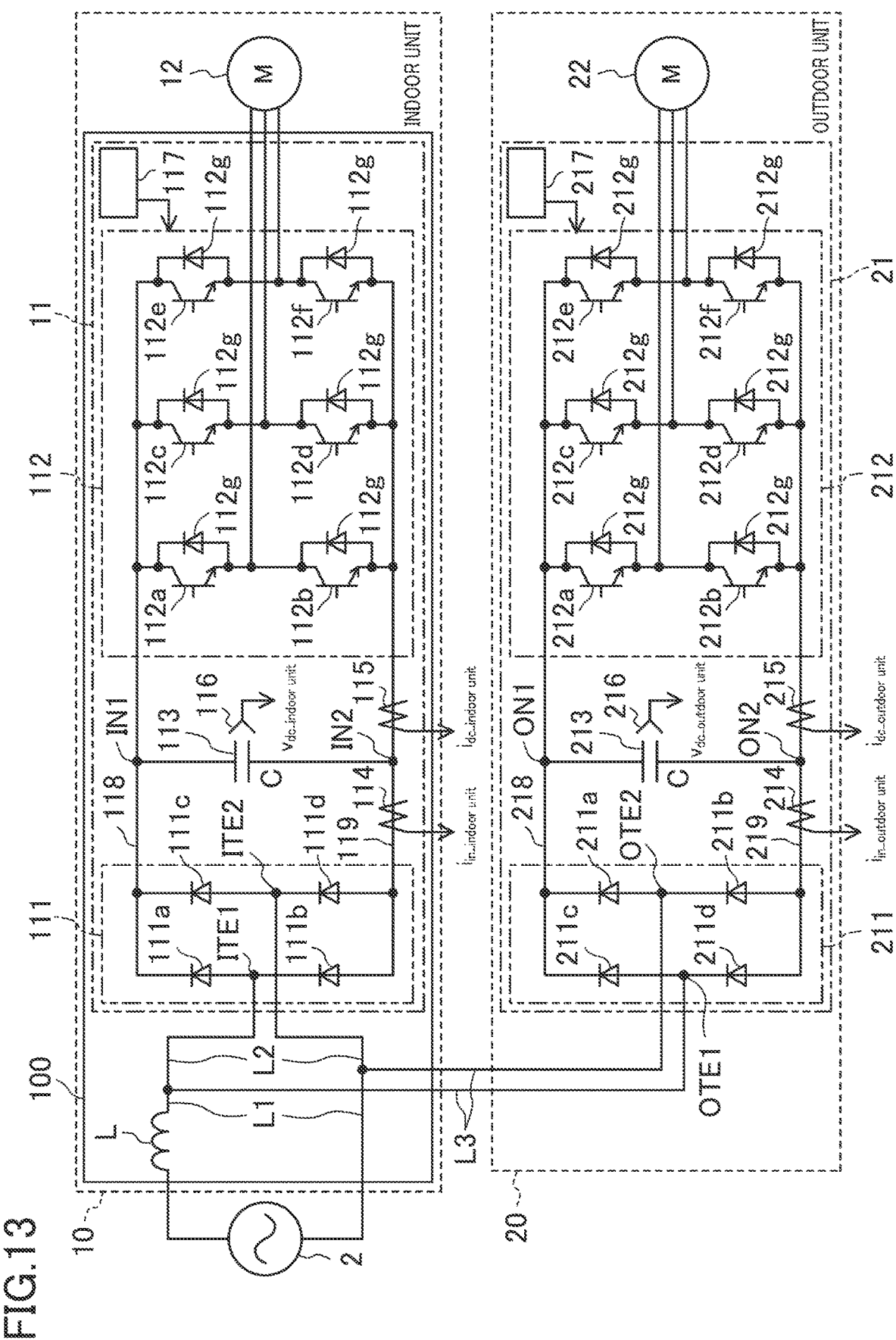
FIG. 13 is a view corresponding to FIG. 1, illustrating a sixth embodiment.

FIG. 13 is a view corresponding to FIG. 1, illustrating a sixth embodiment. In this sixth embodiment, a reactor (L) is provided not in an outdoor unit (20) but in an indoor unit (10). The reactor (L) is housed in the indoor-unit housing.

The reactor (L) has one end connected to a single-phase AC power source (2), and the other end connected to an indoor-unit power converter (11) and an outdoor-unit power converter (21) to be described later. Specifically, AC power is delivered from the AC power source (2) through the reactor (L) to second and third power lines (L2, L3).

The indoor-unit power converter (11) converts the input AC power supplied from the single-phase AC power source (2) through the reactor (L) thereto into output AC power with an intended frequency and an intended voltage, and supplies the resultant AC power to a fan motor (12). The reactor (L), an indoor-unit converter circuit (111), an indoor-unit inverter circuit (112), and an indoor-unit capacitor (113) are mounted on a common substrate (100).

The indoor-unit converter circuit (111) rectifies the input AC power supplied from the single-phase AC power source (2) through the reactor (L) thereto, and outputs the resultant power to first and second indoor-unit DC power lines (118, 119). The reactor (L) is connected between the single-phase AC power source (2) and a first indoor-unit input terminal (ITE1).

An outdoor-unit converter circuit (211) rectifies the input AC power supplied from the single-phase AC power source (2) through the reactor (L) thereto, and outputs the resultant power to first and second outdoor-unit DC power lines (218, 219). The reactor (L) is connected between the single-phase AC power source (2) and a first outdoor-unit input terminal (OTE1).

The sixth embodiment is the same as, or similar to the first embodiment apart from the difference mentioned above. Thus, the like reference characters are used to indicate the like components, and their detailed description will not be repeated.

Thus, according to the sixth embodiment, AC power is supplied from the single-phase AC power source (2) through the reactor (L) to both of the indoor-unit converter circuit (111) and the outdoor-unit converter circuit (211). This allows harmonic components superimposed on the input current of the indoor-unit converter circuit (111) to be less than if AC power is supplied from the single-phase AC power source (2) to the indoor-unit converter circuit (111) without flowing through the reactor (L). As a result, the total of the input currents of the indoor-unit converter circuit (111) and the outdoor-unit converter circuit (211) (i.e., harmonic components superimposed on the input current of the entire air conditioner (1)) can be reduced.

To demonstrate the above-mentioned features, examples (an example, first to third comparative examples) will be described below.

In an example, the input current of the indoor-unit converter circuit (111) of the air conditioner (1) of the sixth embodiment is measured.

In a first comparative example, if input AC power is supplied from the single-phase AC power source (2) to the indoor-unit converter circuit (111) without flowing through the reactor (L), the input voltage and input current of the indoor-unit converter circuit (111) are measured.

Figure 14:
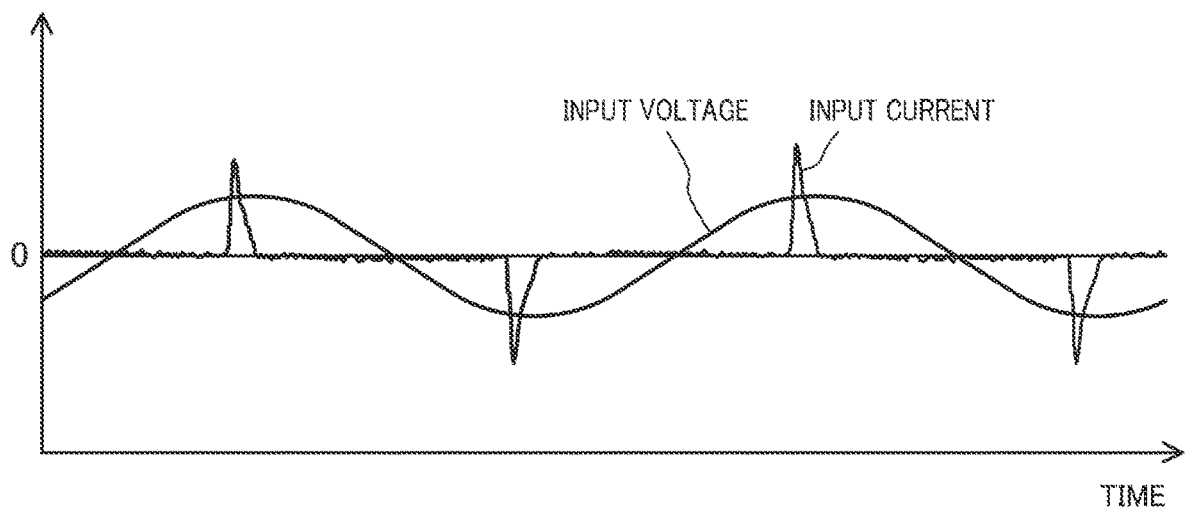
FIG. 14 is a timing diagram showing the input current and input voltage of an indoor-unit converter circuit according to a first comparative example.

FIG. 14 shows the input current and input voltage of the indoor-unit converter circuit (111) according to the first comparative example.

Figure 15:
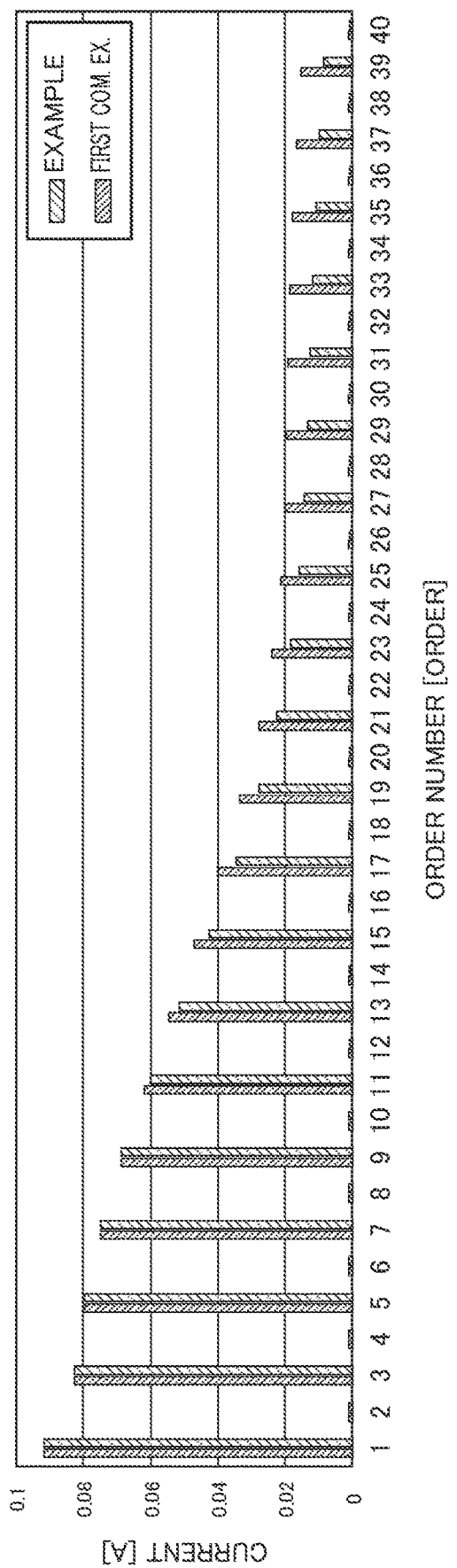
FIG. 15 is a graph showing frequency components of different orders superimposed on the input current of an indoor-unit converter circuit in each of an example and the first comparative example.

FIG. 15 shows frequency components of different orders superimposed on the input current of the indoor-unit converter circuit (111) in each of the example and the first comparative example. The frequency components superimposed on the input current of the indoor-unit converter circuit (111) are obtained through fast Fourier transform (FFT) on the input current of the indoor-unit converter circuit (111).

As shown in FIG. 15, in the example, high-order harmonic components superimposed on the input current of the indoor-unit converter circuit (111) are smaller than those in the first comparative example.

Thus, the example and the first comparative example show that if AC power is supplied from the single-phase AC power source (2) through the reactor (L) to the indoor-unit converter circuit (111), high-order harmonic components superimposed on the input current of the indoor-unit converter circuit (111) can be less than if AC power is supplied from the single-phase AC power source (2) to the indoor-unit converter circuit (111) without flowing through the reactor (L).

In a second comparative example, if, while input AC power is supplied from the single-phase AC power source (2) to the indoor-unit converter circuit (111) without flowing through the reactor (L), input AC power is supplied from the single-phase AC power source (2) through the reactor (L) to the outdoor-unit converter circuit (211), and the inductance of the reactor (L) is a first inductance value, the input current of the outdoor-unit converter circuit (211) is measured.

Figure 16:
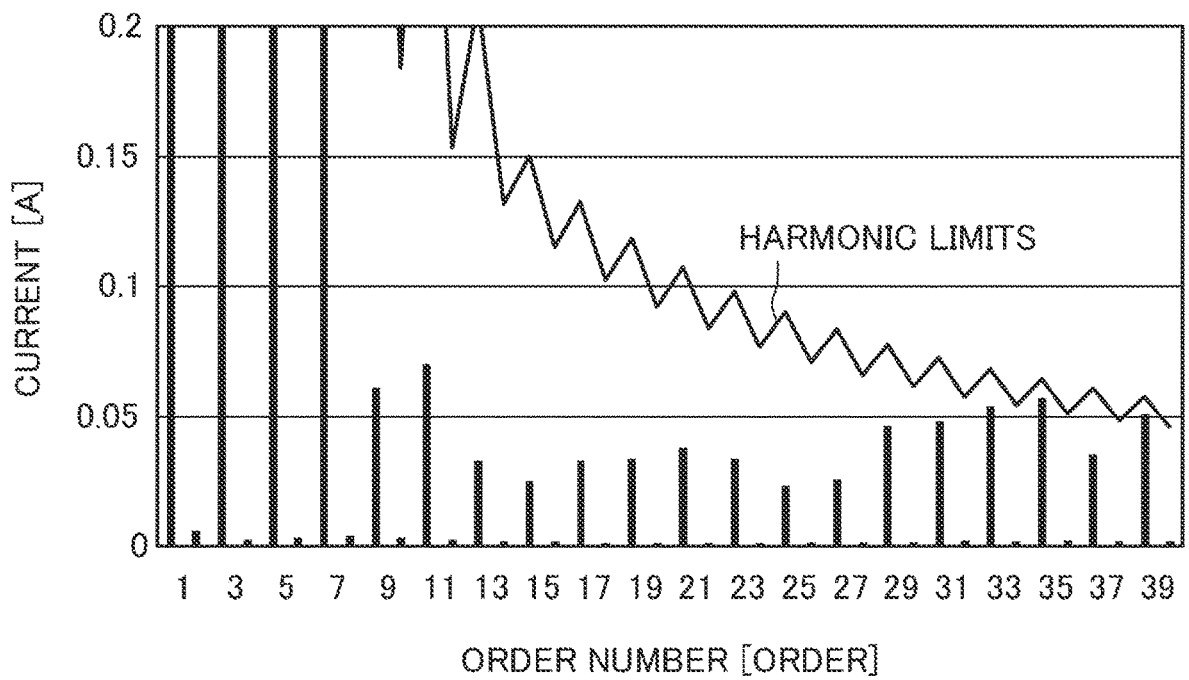
FIG. 16 is a graph showing the limits of harmonic components specified in IEC 61000-3-2 and frequency components of different orders superimposed on the input current of an outdoor-unit converter circuit in a second comparative example.

FIG. 16 shows the limits of harmonic components specified in International Electrotechnical Commission (IEC) 61000-3-2 and frequency components of different orders superimposed on the input current of an outdoor-unit converter circuit (211) in the second comparative example. In each of FIGS. 16 to 18, the limits of harmonic components specified in IEC 61000-3-2 are represented by the line graph, and the frequency components of different orders superimposed on the associated input currents are represented by the bar graph.

In a third comparative example, if, while input AC power is supplied from the single-phase AC power source (2) to the indoor-unit converter circuit (111) without flowing through the reactor (L), input AC power is supplied from the single-phase AC power source (2) through the reactor (L) to the outdoor-unit converter circuit (211), and the inductance of the reactor (L) is a second inductance value that is greater than the first inductance value, the input current of the outdoor-unit converter circuit (211) is measured.

Figure 17:
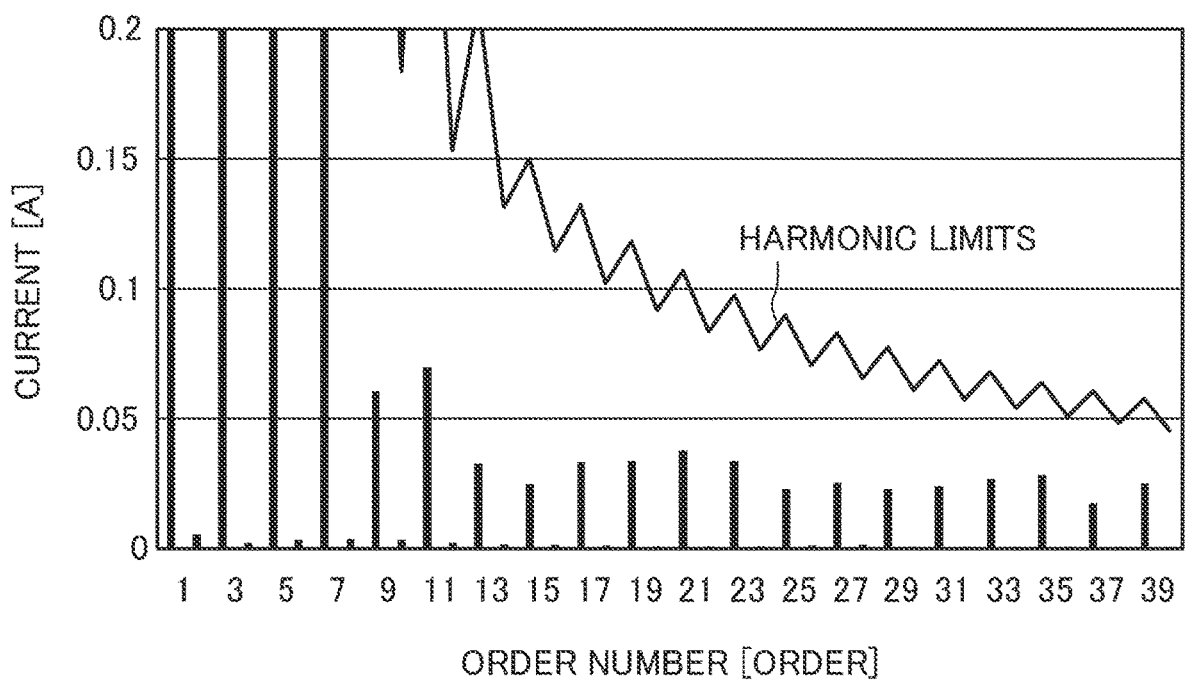
FIG. 17 is a graph showing the limits of harmonic components specified in IEC 61000-3-2 and frequency components of different orders superimposed on the input current of an outdoor-unit converter circuit in a third comparative example.

FIG. 17 shows the limits of harmonic components specified in IEC 61000-3-2 and frequency components of different orders superimposed on the input current of an outdoor-unit converter circuit (211) in the third comparative example.

As shown in FIGS. 16 and 17, in the second comparative example, high-order harmonic components superimposed on the input current of the outdoor-unit converter circuit (211) are larger than those in the third comparative example.

Thus, the second and third comparative examples show that a reduction in the inductance of the reactor (L) triggers an increase in high-order harmonic components superimposed on the input current of the outdoor-unit converter circuit (211).

Figure 18:
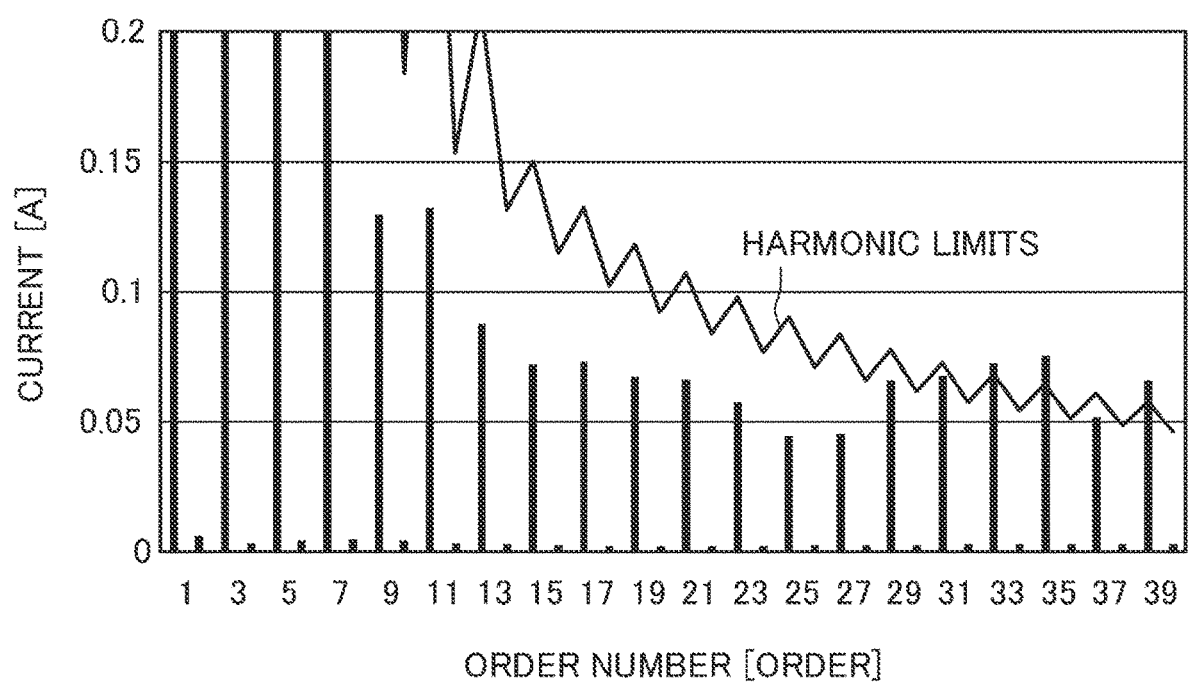
FIG. 18 is a graph showing the limits of harmonic components specified in IEC 61000-3-2 and frequency components of different orders superimposed on the input current of an air conditioner in the second comparative example.

Thus, if, just like the second comparative example, input AC power is supplied from the single-phase AC power source (2) to the indoor-unit converter circuit (111) without flowing through the reactor (L), and the inductance of the reactor (L) interposed between the outdoor-unit converter circuit (211) and the single-phase AC power source (2) is reduced, the total of the input currents of the indoor-unit converter circuit (111) and the outdoor-unit converter circuit (211) (i.e., the input current of the air conditioner (1)) is prevented from complying with IEC 61000-3-2 harmonic standards, as shown in FIG. 18.

However, in this sixth embodiment, AC power is supplied from the single-phase AC power source (2) through the reactor (L) to the indoor-unit converter circuit (111). This allows the inductance of the reactor (L) required to make the input current of the air conditioner (1) comply with the harmonic standard to be lower than if AC power is supplied without flowing through the reactor (L). This can reduce the size of the reactor (L). A reduction in the size of the reactor (L) facilitates mounting the reactor (L) on the substrate on which the indoor-unit converter circuit (111), the indoor-unit inverter circuit (112), and the indoor-unit capacitor (113) are also mounted and securing a space where the reactor (L) is to be housed in the indoor-unit housing of the indoor unit (10).

In this sixth embodiment, the reactor (L), the indoor-unit converter circuit (111), the indoor-unit inverter circuit (112), and the indoor-unit capacitor (113) are mounted on the common substrate (100). This allows the space required in the indoor unit (10) to be smaller than if, in addition to the substrate on which the indoor-unit converter circuit (111), the indoor-unit inverter circuit (112), and the indoor-unit capacitor (113) are to be mounted, another substrate on which the reactor (L) is to be mounted is provided in the indoor unit (10). This can reduce the size of the indoor unit (10).

In this sixth embodiment, the capacitance of the outdoor-unit capacitor (213) is set to be low, and the pulsation of the output voltage of the outdoor-unit converter circuit (211) is allowed. This enables the period during which current passes through the outdoor-unit converter circuit (211) in each half cycle of the input voltage of the outdoor-unit converter circuit (211) to be longer than if the outdoor-unit capacitor (213) completely absorbs fluctuations in the output voltage of the outdoor-unit converter circuit (211). Extending the period during which current passes through the outdoor-unit converter circuit (211) causes harmonic components included in the input current to be smaller. This can reduce the inductance of the reactor (L) required to reduce harmonic components to a predetermined extent, and can reduce the size of the reactor (L).

In this sixth embodiment, the common reactor (L) reduces harmonics in the input current of each of the indoor-unit converter circuit (111) and the outdoor-unit converter circuit (211). Thus, a reactor to reduce harmonics does not have to be in a one-to-one correspondence with each of the indoor-unit converter circuit (111) and the outdoor-unit converter circuit (211). This can reduce the number of components and cost.

Seventh Embodiment

Figure 19:
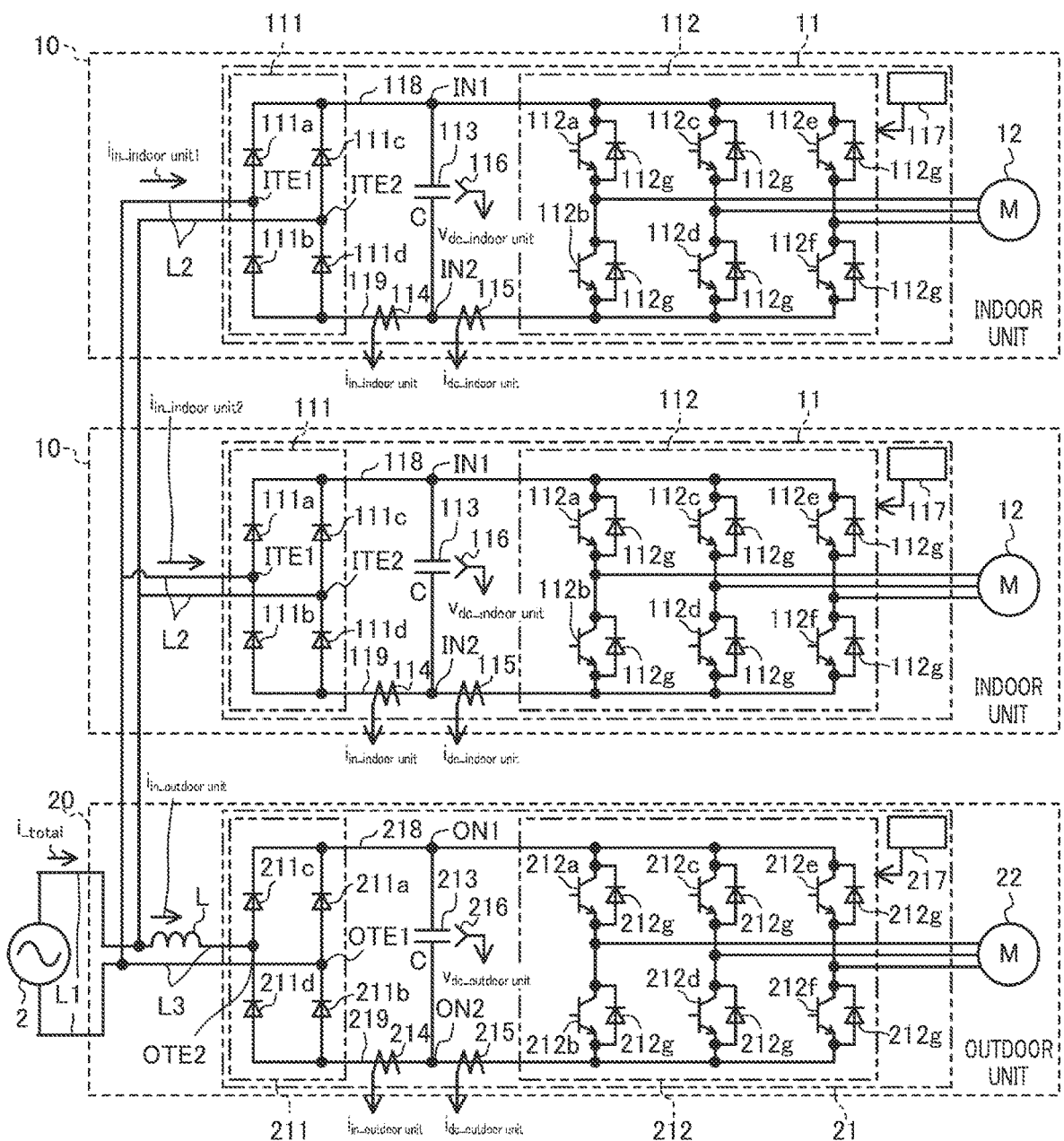
FIG. 19 is a view corresponding to FIG. 1, illustrating a seventh embodiment.

FIG. 19 is a view corresponding to FIG. 1, illustrating a seventh embodiment. In this seventh embodiment, an air conditioner (1) includes two indoor units (10) each provided with a second power line (L2) (i.e., an indoor-unit power line). These second power lines (L2) branch from a common power line (L1). Power is supplied through each second power line (L2) to the indoor-unit power converter (11) of an associated one of the indoor units (10).

In this seventh embodiment, a measured value transmitter (117b) of an indoor-unit control unit (117) of each indoor unit (10) transmits the indoor-unit input current ($i_{in\_indoor\ unit\ 1}$, $i_{in\_indoor\ unit\ 2}$) measured by an associated one of indoor-unit input current measurers (114) to an outdoor unit (20). An input current command unit (217a) of an outdoor-unit control unit (217) calculates a value obtained by subtracting the total of the indoor-unit input currents ($i_{in\_indoor\ unit\ 1}$, $i_{in\_indoor\ unit\ 2}$) from a command value ($i^*_{total}$) of the total current set in advance, in the form of a command value ($i_{in}^*{}_{\_outdoor\ unit}$) of the outdoor-unit input current.

Thus, in this seventh embodiment, the total of the effective values of integer-order components from the second to 40th orders in the total current total) which is obtained by adding up the indoor-unit input currents ($i_{in\_indoor\ unit\ 1}$, $i_{in\_indoor\ unit\ 2}$) flowing through the two second power lines (L2) each provided for an associated one of the two indoor units (10) and the outdoor-unit input current ($i_{in\_outdoor\ unit}$) and which flows through the common power line (L1) is less than the sum of the total of the effective values of integer-order components from the second to 40th orders included in the indoor-unit input currents ($i_{in\_indoor\ unit\ 1}$, $i_{in\_indoor\ unit\ 2}$) that flow through the associated second power lines (L2) each provided for the associated indoor unit (10) and the total of the effective values of integer-order components from the second to 40th orders included in the outdoor-unit input current ($i_{in\_outdoor\ unit}$) that flows through an outdoor-unit power line (L3).

Specifically, the following formula (6) holds true where $i_{k\_indoor\ unit\ 1}$ represents the k-th order component included in the indoor-unit input current ($i_{in\_indoor\ unit\ 1}$) flowing through one of the second power lines (L2), and $i_{k\_indoor\_unit\ 2}$ represents the k-th order component included in the indoor-unit input current ($i_{in\_indoor\ unit\ 2}$) flowing through the other one of the second power lines (L2).

Formula 6

$$\sum_{k=2}^{40} i_{k\_indoor\ unit\ 1} + \sum_{i=2}^{40} i_{k\_indoor\ unit\ 2} + \sum_{i=2}^{40} i_{k\_outdoor\ unit} > \sum_{k=2}^{40} i_{k\_total} \quad \text{Formula (6)}$$

Other Embodiments

In each of the first to seventh embodiments, the outdoor-unit converter circuit (211) or the outdoor-unit inverter circuit (212) is controlled based the measured value of at least one of the indoor-unit input current ($i_{in\_indoor\ unit}$, $i_{in\_indoor\ unit\ 1}$, $i_{in\_indoor\ unit\ 2}$), the indoor-unit direct current ($i_{dc\_indoor\ unit}$), the voltage ($v_{dc\_indoor\ unit}$) across the indoor-unit capacitor (113), or the volume of air from the fan driven by the fan motor (12), but may be controlled based on another value correlated with the indoor-unit input current ($i_{in\_indoor\ unit}$, $i_{in\_indoor\ unit\ 1}$, $i_{in\_indoor\ unit\ 2}$). The outdoor-unit converter circuit (211) or the outdoor-unit inverter circuit (212) may be controlled, for example, based on the power of the fan, the number of revolutions of the fan, the period during which the indoor-unit input current ($i_{in\_indoor\ unit}$, $i_{in\_indoor\ unit\ 1}$, $i_{in\_indoor\ unit\ 2}$) passes therethrough, or a set value set by a remote control for the air conditioner (1). For example, in the fourth embodiment, the outdoor-unit inverter circuit (212) may be controlled using the set value set by the remote control for the air conditioner (1) instead of the measured value of the volume of air (av) from the fan.

In each of the first to seventh embodiments, either the outdoor-unit converter circuit (211) or the outdoor-unit inverter circuit (212) is controlled based on the measured value correlated with the indoor-unit input current ($i_{in\_indoor\ unit}$, $i_{in\_indoor\ unit\ 1}$, $i_{in\_indoor\ unit\ 2}$). Alternatively, both the outdoor-unit converter circuit (211) and the outdoor-unit inverter circuit (212) may be controlled.

In each of the first to seventh embodiments, the air conditioner (1) includes a control means configured to control the outdoor-unit converter circuit (211) or the outdoor-unit inverter circuit (212) based on the measured value correlated with the indoor-unit input current ($i_{in\_indoor\ unit}$, $i_{in\_indoor\ unit\ 1}$, $i_{in\_indoor\ unit\ 2}$). Alternatively, the air conditioner (1) may include a control means configured to control at least either the indoor-unit converter circuit (111) or the indoor-unit inverter circuit (112) based on the measured value correlated with the outdoor-unit input current ($i_{in\_outdoor\ unit}$).

In each of the first to seventh embodiments, the present invention is applied to the air conditioner (1) including the single-phase AC power source (2). Meanwhile, the present invention is applicable also to an air conditioner (1) including a three-phase AC power source. In such a case, the first power line (L1) may allow electricity that has been distributed by a power switchboard that draws electricity from a system power source to flow therethrough. Alternatively, for example, if, just like an air conditioner for commercial use, the indoor unit (10) and the outdoor unit (20) are connected to different power switchboards, the first power line (L1) may be connected to the system power source without passing through a power switchboard, and may branch into the second and third power lines (L2, L3) at a position that is closer to the system power source than the power switchboard is.

In the sixth embodiment, the reactor (L) is provided only in the indoor unit (10), but may be provided only in the outdoor unit (20).

In the seventh embodiment, the AC power may be delivered from the AC power source (2) through the reactor (L) to the second and third power lines (L2, L3). Alternatively, the reactor (L) may be provided not in the outdoor unit (20) but in the first power line (L1) in one of the indoor units (10), and the AC power may be delivered from the AC power source (2) through the reactor (L) to the second and third power lines (L2, L3).

In the seventh embodiment, the two indoor units (10) are provided. However, two or more indoor units may be provided.

The present invention may be used to make an air conditioner (1) comply with standards except International Electrotechnical Commission (IEC) 61000-3-2, and is applicable also to an air conditioner (1) that does not comply with International Electrotechnical Commission (IEC) 61000-3-2.

While the embodiments have been described above, it will be understood that various changes in form and details can be made without departing from the spirit and scope of the claims. The embodiments and variations described above may be appropriately combined or modified by replacing the elements thereof, as long as the functions of the subject matters of the present disclosure are not impaired.

The present disclosure is useful as an air conditioner including an indoor unit and an outdoor unit.

The invention claimed is:

1. An air conditioner comprising:
an indoor unit;
an outdoor unit;
an indoor-unit power line; and
an outdoor-unit power line,
the indoor-unit and outdoor-unit power lines branching from a common power line connected to an AC power source,
power being supplied from the indoor-unit power line to the indoor unit,
power being supplied from the outdoor-unit power line to the outdoor unit,
each of the indoor unit and the outdoor unit including
a converter circuit configured to rectify AC power delivered from the AC power source to an associated one of the power lines to DC power and to output the DC power,
an inverter circuit configured to convert the DC power output by the converter circuit into AC power, and
a capacitor connected between input nodes of the inverter circuit,
a total of effective values of integer-order components from second to 40th orders in a total current, which is obtained by adding up an indoor-unit input current and an outdoor-unit input current and which flows through the common power line being less than a sum of
a total of effective values of integer-order components from the second to 40th orders included in the indoor-unit input current that flows through the indoor-unit power line and
a total of effective values of integer-order components from the second to 40th orders included in the outdoor-unit input current that flows through the outdoor-unit power line.

2. The air conditioner of claim 1, wherein
a total of the effective values of the integer-order components from the 15th to 40th orders in the total current is less than a sum of
a total of the effective values of the integer-order components from the 15th to 40th orders in the indoor-unit input current and
a total of the effective values of the integer-order components from the 15th to 40th orders in the outdoor-unit input current.

3. The air conditioner of claim 1, wherein
a difference obtained by subtracting the total of the effective values of the integer-order components from the second to 40th orders in the total current from the sum of
the total of the effective values of the integer-order components from the second to 40th orders in the indoor-unit input current and
the total of the effective values of the integer-order components from the second to 40th orders in the outdoor-unit input current
is larger than ¾ of the total of the effective values of the integer-order components from the second to 40th orders in the indoor-unit input current.

4. The air conditioner of claim 1, wherein
an effective value of an integer-order component of at least one of the second to 40th orders in the total current is less than an effective value of a component of the same order in the outdoor-unit input current.

5. The air conditioner of claim 1, further comprising:
a control unit that includes a microcomputer and a memory, the control unit being configured to control at least either the converter circuit or the inverter circuit of one of the indoor unit or the outdoor unit, based on a value correlated with the input current of an other one of the indoor unit or the outdoor unit.

6. The air conditioner of claim 1, wherein
either the indoor unit or the outdoor unit includes a reactor,
the AC power is delivered from the AC power source through the reactor to the indoor-unit power line, and
the AC power is delivered from the AC power source through the reactor to the outdoor-unit power line.

7. The air conditioner of claim 1, wherein
the inverter circuit of the outdoor unit includes switching elements, and the inverter circuit of the outdoor unit converts the DC power outputted by the converter circuit of the outdoor unit into AC power by switching operations of the switching elements, and
an output voltage of the converter circuit of the outdoor unit has a pulsation, and a maximum value of the pulsation is greater than or equal to twice a minimum value of the pulsation.

8. The air conditioner of claim 1, wherein
the indoor unit includes a reactor, and
the reactor, the converter circuit of the indoor unit, the inverter circuit of the indoor unit, and the capacitor of the indoor unit are mounted on a common substrate.

9. The air conditioner of claim 1, further comprising:
at least one additional indoor unit such that the air conditioner includes a plurality of indoor units; and
at least one additional indoor-unit power line such that the air conditioner includes a plurality of indoor-unit power lines, and
each the plurality of indoor-unit power lines being provided for an associated one of the plurality of indoor units and branching from the common power line, and
a total of effective values of integer-order components of the second to 40th orders in a total current, which is obtained by adding up indoor-unit input currents flowing through the plurality of indoor-unit power lines each provided for an associated one of the plurality of indoor units and the outdoor-unit input current and which flows through the common power line, being less than a sum of
a total of effective values of integer-order components of the second to 40th orders included in the indoor-unit input currents that flow through the indoor-unit power lines each provided for an associated one of the plurality of indoor units and
the total of the effective values of the integer-order components of the second to 40th orders included in the outdoor-unit input current that flows through the outdoor-unit power line.

10. The air conditioner of claim 2, wherein
an effective value of an integer-order component of at least one of the second to 40th orders in the total current is less than an effective value of a component of the same order in the outdoor-unit input current.

11. The air conditioner of claim 2, further comprising:
a control unit that includes a microcomputer and a memory, the control unit being configured to control at least either the converter circuit or the inverter circuit of one of the indoor unit or the outdoor unit, based on a value correlated with the input current of an other one of the indoor unit or the outdoor unit.

12. The air conditioner of claim 2, wherein
the inverter circuit of the outdoor unit includes switching elements, and the inverter circuit of the outdoor unit converts the DC power outputted by the converter circuit of the outdoor unit into AC power by switching operations of the switching elements, and
an output voltage of the converter circuit of the outdoor unit has a pulsation, and a maximum value of the pulsation is greater than or equal to twice a minimum value of the pulsation.

13. The air conditioner of claim 2, further comprising:
at least one additional indoor unit such that the air conditioner includes a plurality of indoor units; and
at least one additional indoor-unit power line such that the air conditioner includes a plurality of indoor-unit power lines, and
each the plurality of indoor-unit power lines being provided for an associated one of the plurality of indoor units and branching from the common power line, and
a total of effective values of integer-order components of the second to 40th orders in a total current, which is obtained by adding up indoor-unit input currents flowing through the plurality of indoor-unit power lines each provided for an associated one of the plurality of indoor units and the outdoor-unit input current and which flows through the common power line, being less than a sum of
a total of effective values of integer-order components of the second to 40th orders included in the indoor-unit input currents that flow through the indoor-unit power lines each provided for an associated one of the plurality of indoor units and
the total of the effective values of the integer-order components of the second to 40th orders included in the outdoor-unit input current that flows through the outdoor-unit power line.

14. The air conditioner of claim 4, further comprising:
a control unit that includes a microcomputer and a memory, the control unit being configured to control at least either the converter circuit or the inverter circuit of one of the indoor unit or the outdoor unit, based on a value correlated with the input current of an other one of the indoor unit or the outdoor unit.

15. The air conditioner of claim 4, wherein
the inverter circuit of the outdoor unit includes switching elements, and the inverter circuit of the outdoor unit converts the DC power outputted by the converter circuit of the outdoor unit into AC power by switching operations of the switching elements, and
an output voltage of the converter circuit of the outdoor unit has a pulsation, and a maximum value of the pulsation is greater than or equal to twice a minimum value of the pulsation.

16. The air conditioner of claim 4, wherein further comprising:
at least one additional indoor unit such that the air conditioner includes a plurality of indoor units; and
at least one additional indoor-unit power line such that the air conditioner includes a plurality of indoor-unit power lines, and
each the plurality of indoor-unit power lines being provided for an associated one of the plurality of indoor units and branching from the common power line, and
a total of effective values of integer-order components of the second to 40th orders in a total current, which is obtained by adding up indoor-unit input currents flowing through the plurality of indoor-unit power lines each provided for an associated one of the plurality of indoor units and the outdoor-unit input current and which flows through the common power line, being less than a sum of a total of effective values of integer-order components of the second to 40th orders included in the indoor-unit input currents that flow through the indoor-unit power lines each provided for an associated one of the plurality of indoor units and the total of the effective values of the integer-order components of the second to 40th orders included in the outdoor-unit input current that flows through the outdoor-unit power line.

17. The air conditioner of claim 5, wherein the inverter circuit of the outdoor unit includes switching elements, and the inverter circuit of the outdoor unit converts the DC power outputted by the converter circuit of the outdoor unit into AC power by switching operations of the switching elements, and an output voltage of the converter circuit of the outdoor unit has a pulsation, and a maximum value of the pulsation is greater than or equal to twice a minimum value of the pulsation.

18. The air conditioner of claim 5, further comprising:

at least one additional indoor unit such that the air conditioner includes a plurality of indoor units; and at least one additional indoor-unit power line such that the air conditioner includes a plurality of indoor-unit power lines, and each the plurality of indoor-unit power lines being provided for an associated one of the plurality of indoor units and branching from the common power line, and a total of effective values of integer-order components of the second to 40th orders in a total current, which is obtained by adding up indoor-unit input currents flowing through the plurality of indoor-unit power lines each provided for an associated one of the plurality of indoor units and the outdoor-unit input current and which flows through the common power line, being less than a sum of a total of effective values of integer-order components of the second to 40th orders included in the indoor-unit input currents that flow through the indoor-unit power lines each provided for an associated one of the plurality of indoor units and the total of the effective values of the integer-order components of the second to 40th orders included in the outdoor-unit input current that flows through the outdoor-unit power line.

19. The air conditioner of claim 7, further comprising:

at least one additional indoor unit such that the air conditioner includes a plurality of indoor units; and at least one additional indoor-unit power line such that the air conditioner includes a plurality of indoor-unit power lines, and each the plurality of indoor-unit power lines being provided for an associated one of the plurality of indoor units and branching from the common power line, and a total of effective values of integer-order components of the second to 40th orders in a total current, which is obtained by adding up indoor-unit input currents flowing through the plurality of indoor-unit power lines each provided for an associated one of the plurality of indoor units and the outdoor-unit input current and which flows through the common power line, being less than a sum of a total of effective values of integer-order components of the second to 40th orders included in the indoor-unit input currents that flow through the indoor-unit power lines each provided for an associated one of the plurality of indoor units and the total of the effective values of the integer-order components of the second to 40th orders included in the outdoor-unit input current that flows through the outdoor-unit power line.

* * * * *